Sept. 26, 1961  A. L. M. A. ROUY  3,001,439
APPARATUS AND METHOD FOR POLARIMETRIC ANALYSIS
Filed Oct. 15, 1957  8 Sheets-Sheet 1
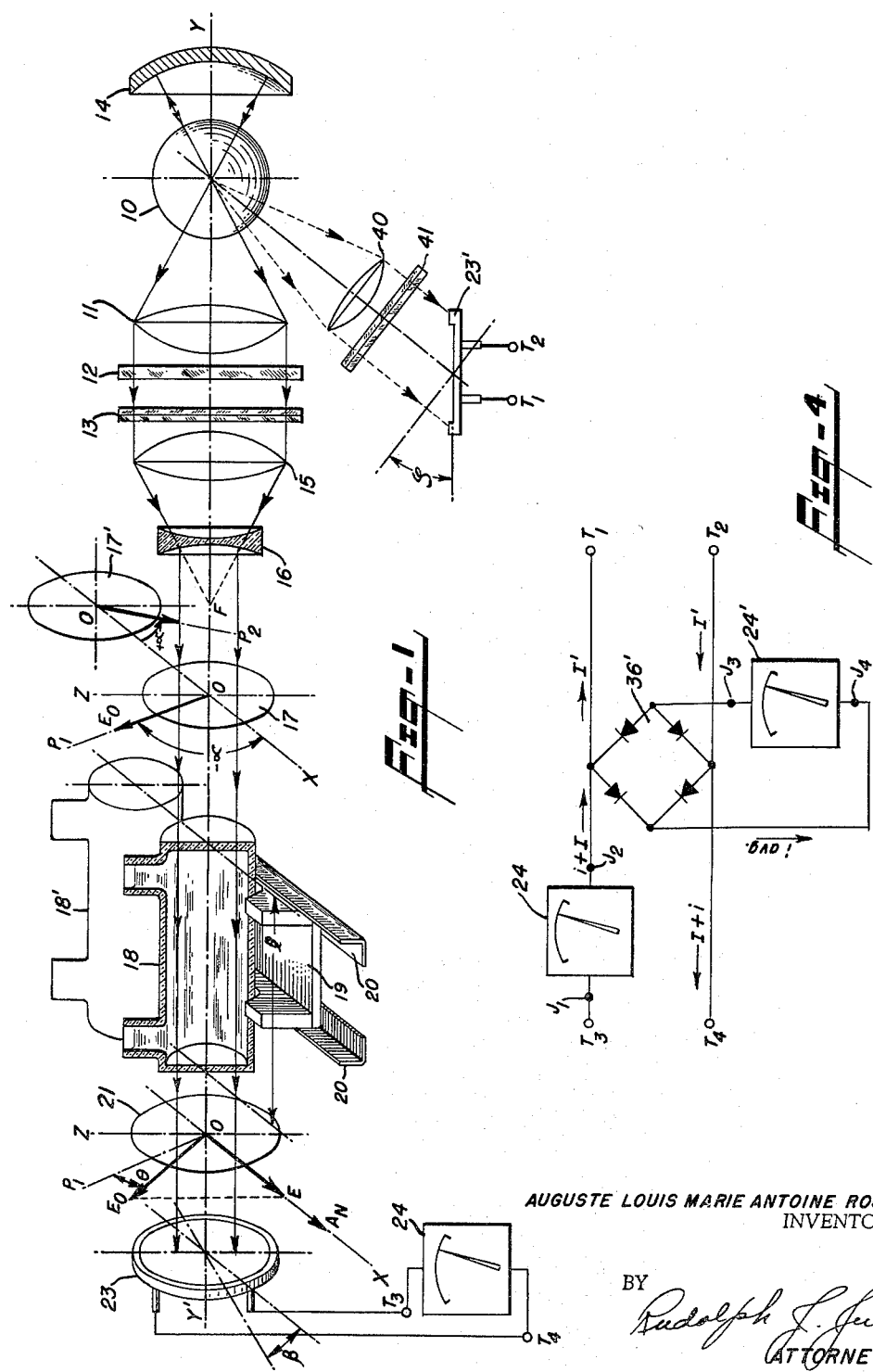
AUGUSTE LOUIS MARIE ANTOINE ROUY
INVENTOR.

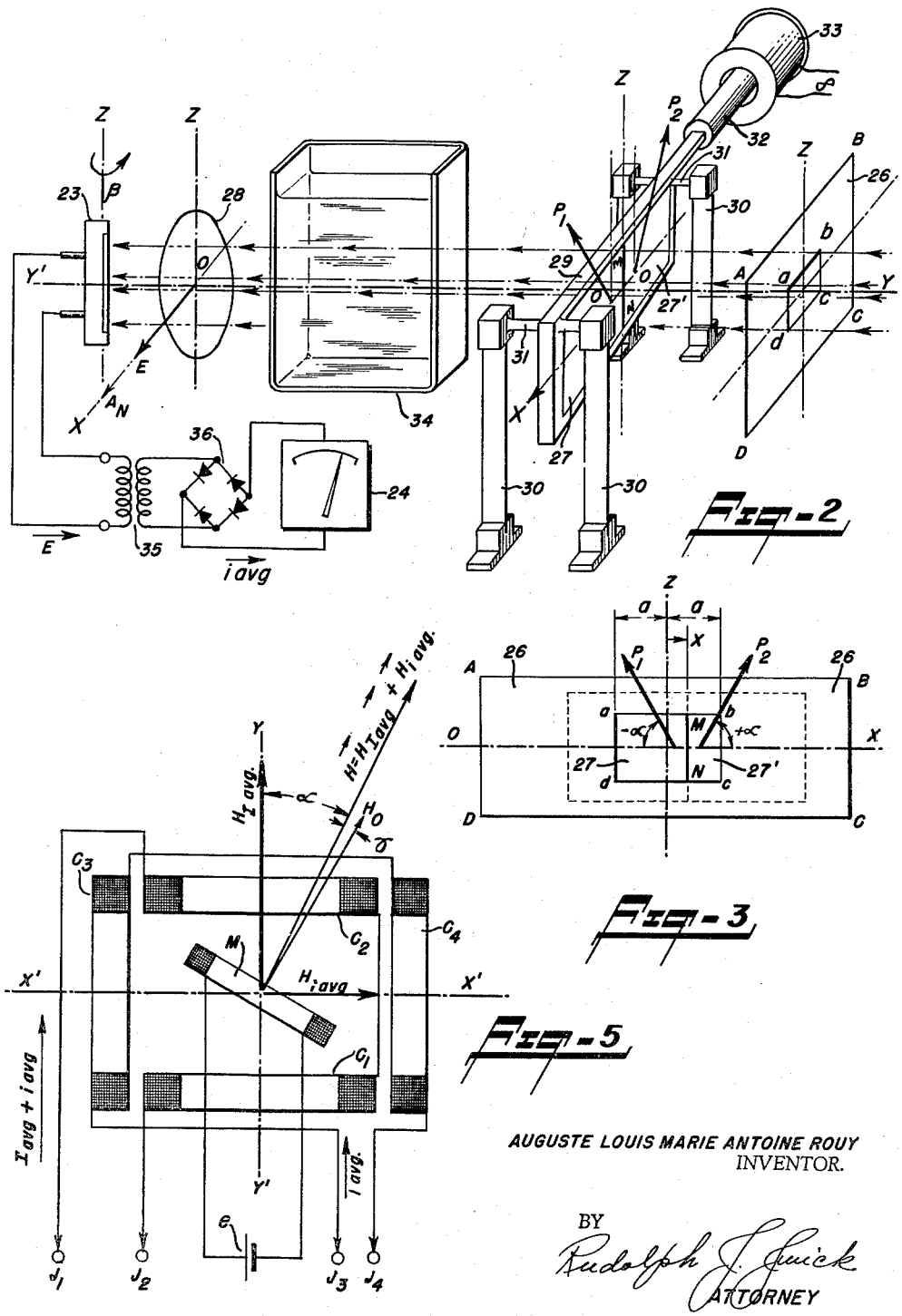

AUGUSTE LOUIS MARIE ANTOINE ROUY
INVENTOR.

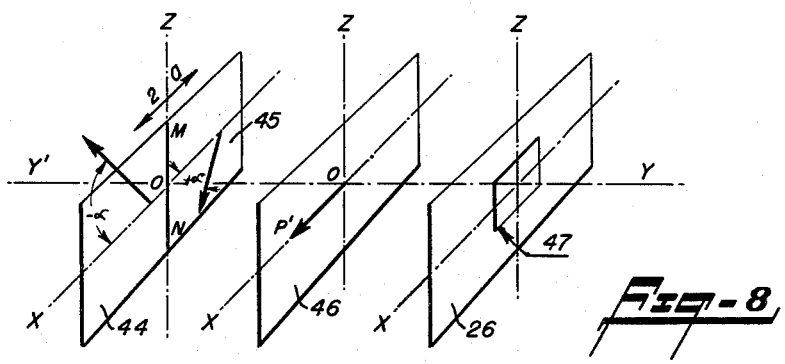
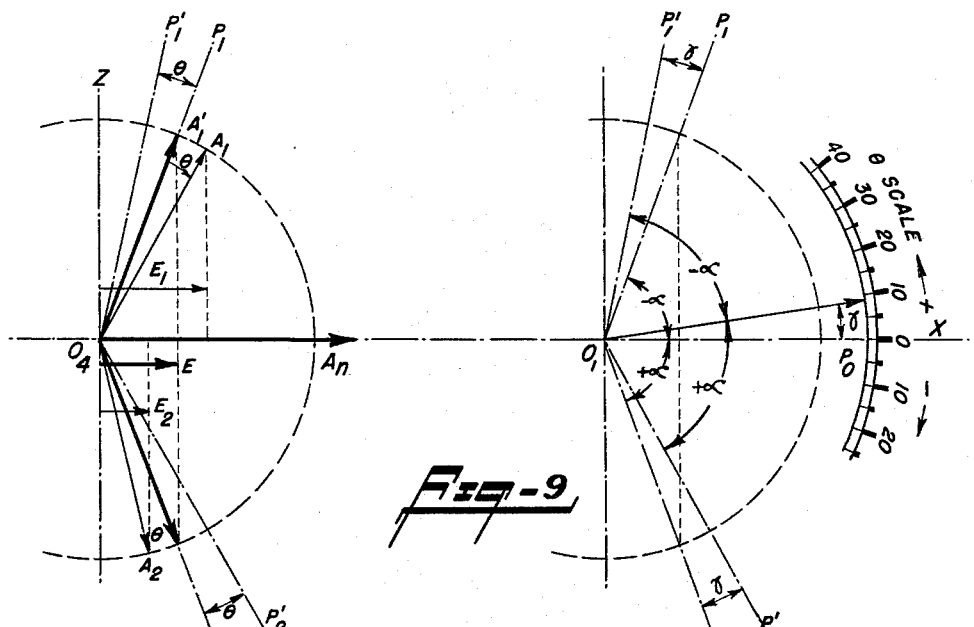

Sept. 26, 1961 A. L. M. A. ROUY 3,001,439
APPARATUS AND METHOD FOR POLARIMETRIC ANALYSIS
Filed Oct. 15, 1957 8 Sheets-Sheet 5
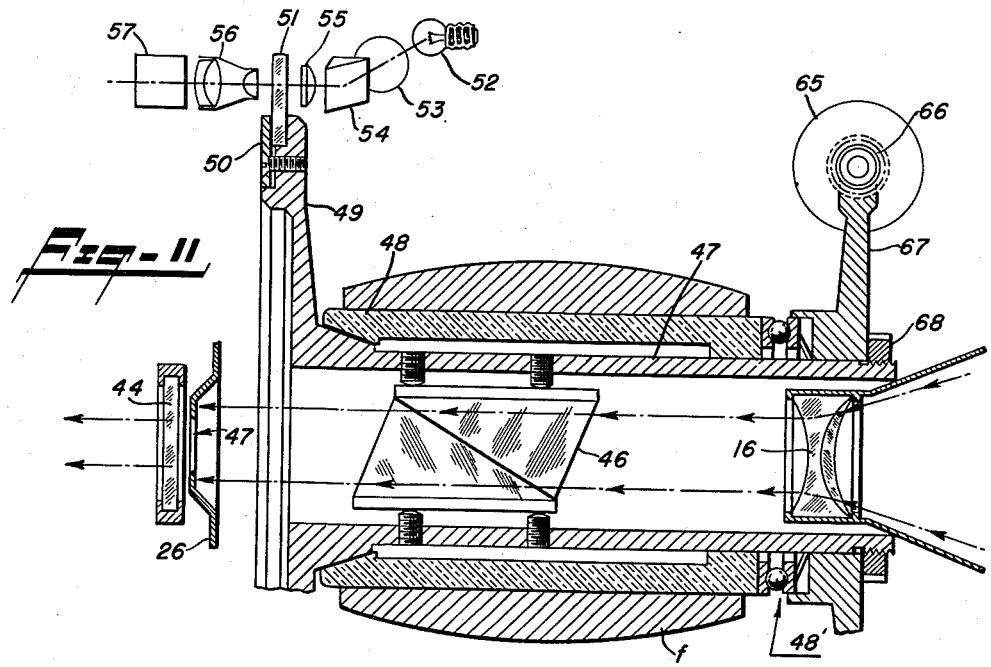
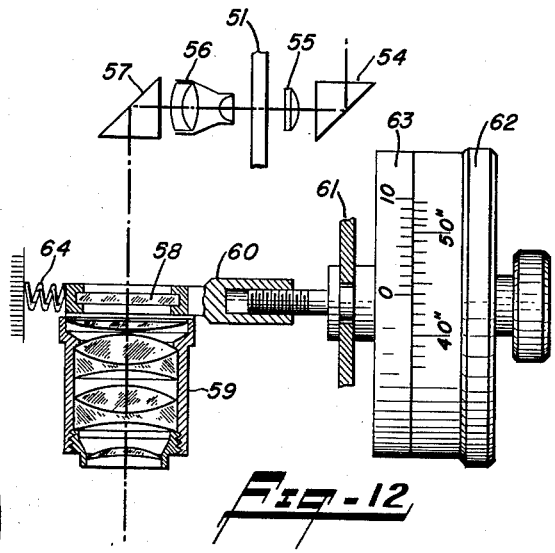
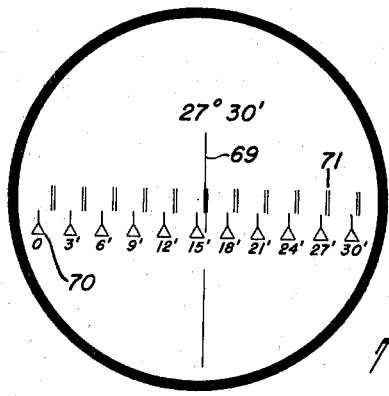
READING 27°45' 43.8"
AUGUSTE LOUIS MARIE ANTOINE ROUY
INVENTOR.
BY
Rudolph J. Smick
ATTORNEY Sept. 26, 1961  A. L. M. A. ROUY  3,001,439
APPARATUS AND METHOD FOR POLARIMETRIC ANALYSIS
Filed Oct. 15, 1957   8 Sheets-Sheet 6
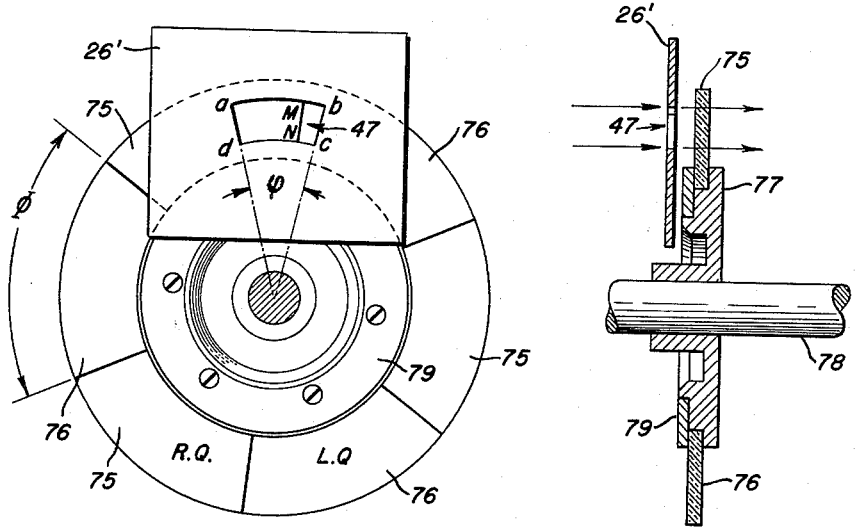
*Fig-14*   *Fig-15*
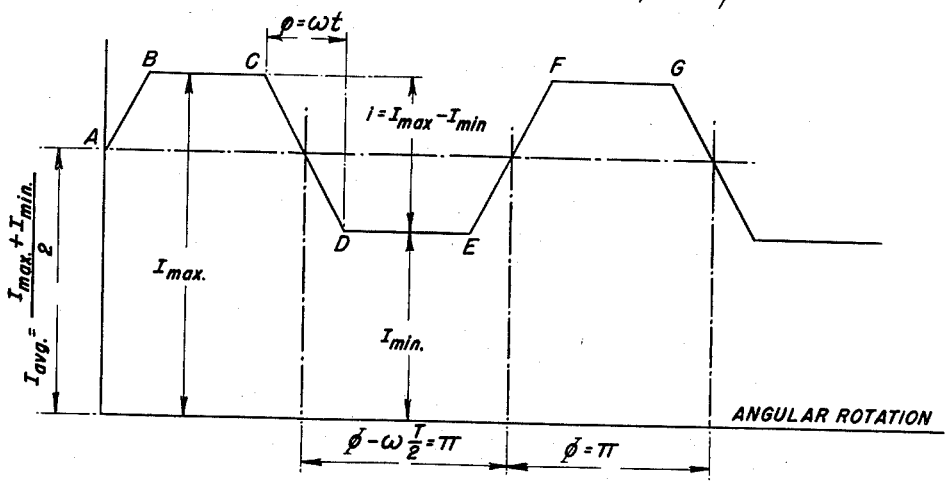
*Fig-16*
AUGUSTE LOUIS MARIE ANTOINE ROUY
INVENTOR.
BY
Rudolph J. Juick
ATTORNEY

AUGUSTE LOUIS MARIE ANTOINE ROUY
INVENTOR.

United States Patent Office 3,001,439
Patented Sept. 26, 1961

3,001,439
APPARATUS AND METHOD FOR POLARIMETRIC ANALYSIS
Auguste Louis Marie Antoine Rouy, Scarsdale, N.Y., assignor, by mesne assignments, to Daystrom, Incorporated, Murray Hill, N.J., a corporation of New Jersey
Filed Oct. 15, 1957, Ser. No. 690,395
17 Claims. (Cl. 88—14)

This invention relates to apparatus for polarimetric analysis and more particularly to novel methods and apparatus for determining the angular rotation of the plane of polarization of a polarized light beam by a substance traversed by the light beam.

It is known that substances exhibit to a greater or lesser degree the property of rotating the plane of polarization of a polarized light beam traversing the substance. Since the magnitude of such angular rotation contributed by the molecules of the substance, be it levogyre, or dextrogyre, depends upon the degree of asymmetry present in the molecular structure, the extent of the angular rotation provides a means of qualitative and quantitative analysis as well as valuable information relating to the structure of molecules.

In my co-pending United States patent application Serial Number 654,929, filed April 24, 1957, and entitled "Method and Apparatus for Polarimetric Analysis," I disclose novel methods and apparatus for amplifying the extent of the angular rotation of the plane of polarization of a polarized light beam brought about by a substance interposed in such light beam. The disclosed methods are useful for performing polarimetric analysis on substances in the liquid, gas, vapor, or solid state and irrespective af variations in color and density. Such methods inherently offer a degree of sensitivity and repetitive accuracy heretofore unattained in this field.

The present invention utilizes the broad principles disclosed in my above-identified, co-pending application and is directed to the provision of improved apparatus and methods particularly useful for providing an automatic and continuous measure of the optical angular rotation of the plane of polarization of a polarized light beam by a chemically active substance. Broadly, the methods and apparatus of this invention are based upon the modulation of a polarized light beam, that is, the abrupt angular shifting of the plane of the polarized light beam back and forth in two directions. The angular extent of such shifting of the light beam is defined by known but opposite angles with respect to reference plane. Such reference plane coincides with the plane of polarization of a light-polarizing member referred to as an analyzer. In the preferred arrangement, the angular shifting of the polarized light beam in two directions makes angles of equal absolute value and opposite in sign relative to the plane of polarization of the analyzer. Further, such shifting of the plane of polarization of the light beam is accomplished either by means of a pair of light-polarizing members which have their respective planes of light polarization oriented at known and opposite angles relative to the plane of polarization of the analyzer or by a pair of dextrogyre or levogyre members causing the plane of polarization of a polarized light beam to rotate to the right or left by angular amounts equal in magnitude but opposite in sign.

The modulated, polarized light beam is passed through the substance under test and then through the analyzer. A suitable light transducer converts the light beam emerging from the analyzer into corresponding electrical variations. Because of the modulation of the light beam the electrical output of the light transducer includes A.C. and D.C. components. With a proper angular adjustment of the original plane of polarization of the light beam and by utilizing a suitable measuring circuit, the D.C. component of the transducer output is balanced out to zero whereby the A.C. component of such output provides a direct measure of the optical angular rotation of the light beam by the substance under test. Such arrangements not only afford extremely high sensitivity and accuracy but they are adapted for use in automatic control systems, particularly of the type wherein a chemical stream is continuously monitored for maximum operating efficiency of the process. So far as I am aware, there exists no polarimetric apparatus or method suitable for this purpose.

An object of this invention is the provision of apparatus and methods for polarimetric analysis by means of which there is obtained a direct measure of the optical rotation of the plane of polarization of a polarized light beam by a substance interposed in the light beam, and which is of such character that it is adapted for instantaneous and continuous control purposes.

An object of this invention is the provision of a novel method of polarimetric analysis which comprises modulating a polarized light beam at a constant frequency, passing the modulated light beam through a substance under test, and then through an analyzer and converting the light beam emerging from the analyzer into an electric current, which current is a measure of the optical rotary power of the substance.

An object of this invention is the provision of a method of polarimetric analysis which method comprises passing a polarized light beam through a substance under test and then through an analyzer having a known plane of light polarization, abruptly shifting the plane of polarization of the light beam as it enters the substance in two directions making known but opposite angles with respect to the plane of polarization of the analyzer and at a constant frequency, and measuring the energy of the light beam emerging from the analyzer.

An object of this invention is the provision of a method of polarimetric analysis which method comprises passing a polarized light beam through a substance under test and then through an analyzer having a known plane of light polarization, abruptly changing the plane of polarization of the light beam as it enters the substance to the left and right by angular amounts of known magnitude but opposite sign with respect to the plane of polarization of the analyzer and at a constant frequency, and measuring the energy of the light beam emerging from the analyzer.

An object of this invention is the provision of a method for determining the angular rotation of the plane of polarization of a polarized light beam by a substance traversed by the light beam, which method comprises modulating the light beam as it enters the substance, passing the light beam emerging from the substance through an analyzer having its plane of polarization coinciding with the normal plane of polarization of the light beam, converting the light beam emerging from the analyzer into corresponding electrical variations and reducing to zero the D.C. component of such electrical variations whereby the A.C. component provides a measure of the said angular rotation.

An object of this invention is the provision of polarimetric apparatus comprising means forming a light beam adapted to pass through a solution under test and then through an analyzer having a known plane of light polarization, a pair of light-polarizers spaced from the analyzer which polarizers have their respective planes of light polarization oriented at known but opposite angles with respect to the plane of polarization of the analyzer, means alternately interposing the said light-polarizers into the light beam as it enters the solution and at a constant frequency, and means responsive to the light beam emerging from the analyzer.

An object of this invention is the provision of polarimetric apparatus comprising means forming a light beam adapted to pass through a solution under test and then through an analyzer having a known plane of light polarization, a light-polarizer disposed in the light beam ahead of the solution and having its plane of light polarization coinciding with that of the said analyzer, a pair of left and right light-rotating members, means alternately inserting the said light-rotating members into the light beam between the said light-polarizer and the solution at a constant frequency, and means responsive to the light beam emerging from the said analyzer.

An object of this invention is the provision of polarimetric apparatus comprising means forming a polarized light beam adapted to pass through a solution under test and then through an analyzer having a known plane of light polarization, means converting the light beam emerging from the analyzer into electrical variations, means alternately shifting at a constant frequency the plane of polarization of the light beam in two directions representing known but opposite angles with respect to the plane of polarization of the analyzer whereby the said electrical variations include A.C. and D.C. components, means to balance the D.C. components to zero, and means responsive to the said A.C. components.

These and other objects and advantages will become apparent from the following description when taken with the accompanying drawings illustrating several embodiments of the invention. It will be understood, however, that the drawings are for purposes of illustration and are not to be construed as defining the scope or limits of the invention, reference being had for the latter purpose to the appended claims.

In the drawings wherein like reference characters denote like parts in the several views:

FIGURE 1 is a diagrammatic representation, with parts in section, and showing the arrangement of the components in apparatus made in accordance with one embodiment of the invention;

FIGURE 2 is a diagrammatic representation showing a modification of the FIGURE 1 arrangement, and wherein the two polarizers are vibrated for alternate insertion into and out of the light beam;

FIGURE 3 is a view looking at the screen, of the FIGURE 2 system, and showing a relative displacement of the polarizers from the normal, at rest, position;

FIGURE 4 is a circuit diagram of an arrangement for measuring the electrical output of one light transducer;

FIGURE 5 is a circuit diagram showing a ratio meter for the direct measurement of certain ratios of the light transducer outputs;

FIGURE 8 is a diagrammatic representation showing an arrangement wherein modulation of the polarized light beam is accomplished by means of a pair of dextrogyre and levogyre light-rotating members;

FIGURES 9 and 10 are vector diagrams of the system;

FIGURE 11 is a central sectional view of an arrangement for precision measurement of the angular rotation of the polarizer, and including associated parts shown in isometric;

FIGURE 12 is a diagrammatic representation showing the microscope arrangement for reading the extent of angular rotation of the polarizer shown in FIGURE 11;

FIGURE 13 is an enlarged view showing the field of view observed through the eyepiece of the microscope as used in the arrangements shown in FIGURES 11 and 12;

FIGURE 14 is a front view of another embodiment of the invention wherein the quartz plates for shifting the plane of polarization of the light beam are mounted for rotation;

FIGURE 15 is a vertical, central, cross-sectional view of the FIGURE 14 construction;

FIGURE 16 are curves of the electric current output of the light transducer obtained with the arrangement shown in FIGURES 14 and 15;

Figure 6:
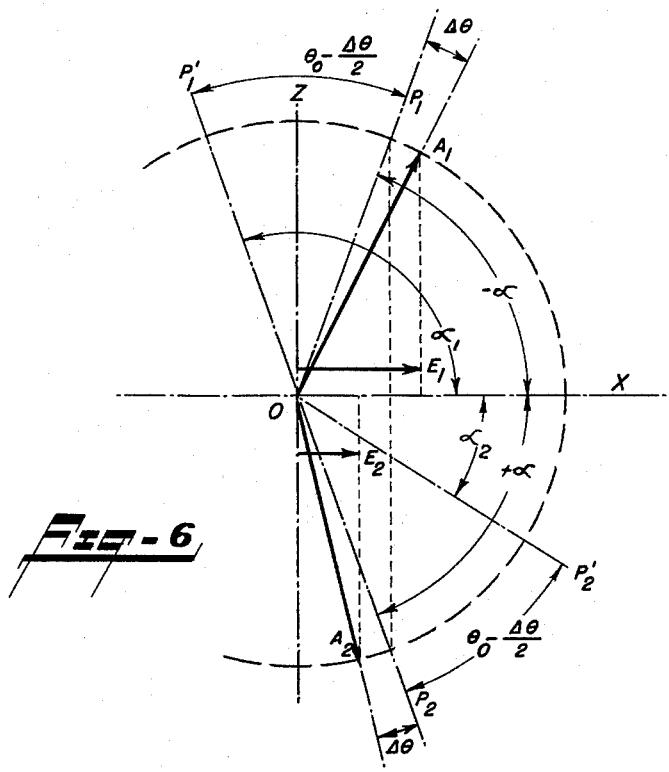
FIGURE 6 is a vector diagram showing the various functions which are to be considered when determining the departure of an optically active chemical from a known level of concentration, with a high degree of accuracy.

Reference specifically is now made to FIGURE 1 wherein the optical axis of the apparatus is identified by the letters Y—Y'. A light source 10, either a tungsten filament lamp or a high pressure mercury vapor arc source, emits light rays which are gathered by an optical condenser lens 11. A heat filter 12 absorbs the heat rays while the mono-chromatic filter 13, which can be either an absorption or interference type or both, isolates a selected narrow band of the light spectrum. A spherical, concave mirror 14 is centered on the optical axis and increases the amount of light energy entering the system.

After traversing the filter 13, the substantially parallel light rays are collected by a second condensing lens 15 which causes the entering parallel rays to converge at the focal point F centered on the optical axis. However, before reaching such focal point, the light rays traverse a diverging lens 16 whose focal point coincides with the point F. As a consequence of this specific arrangement, the diverging lens 16 transforms the converging light rays into a parallel light beam of small diameter and centered about the optical axis Y—Y'. Such a combination increases considerably the light flux density per unit of cross sectional area of the light beam thereby decreasing the physical dimensions, and cost, of the different component parts. The same concentration of the light flux within a narrow beam could be accomplished by replacing the diverging lens 16 by a converging lens but placed after the focusing point F in the direction of the propagation of light and at a point removed from the focal point F equal to its focal distance. However, such latter arrangement increases the overall length of the optical system by twice the focal distance of the last lens. Apart from the advantage of reduced length, the diverging lens 16, being a so called negative element, facilitates the correction of spherical and chromatic aberrations of the optical condenser system as a whole.

The high flux density, narrow beam of parallel light rays, after emergence from the negative lens 16, progresses along the optical axis Y—Y' and traverses a light-polarizing member or polarizer 17. Such polarizer may be a light-polarizing film, Nicol prism, or other type, oriented perpendicular to the general direction Y—Y'. The plane of light polarization of the polarizer 17 is so oriented, as indicated by the line O—$P_1$, that the light vibration amplitude vector indicated by the arrow O—$E_0$ makes a known, predetermined angle $-\alpha$ with the reference axis O—X, said reference axis O—X being mutually perpendicular to the vertical axis O—Z and the optical axis Y—Y'.

After emerging from the polarizer 17, the now polarized light beam impinges on the transparent, flat end of a vessel 18, said vessel being made of a material which does not react with the test chemicals, or their solutions, contained therein. The vessel 18 is so designed as to possess two transparent, plano-parallel, flat ends whose inner surfaces are spaced at a known or measurable distance $l$ from each other. A supporting device, such as a slidable carriage 19, guided in its displacement by appropriate slideways 20, carries the vessel, or test tube 18 and centers it on the optical axis Y—Y'. When in position in the guiding receptacle, or supporting carriage, the test tube 18 presents the transparent end surfaces in a direction perpendicular to the direction of the light beam. A second, similar test tube 18' is likewise supported by the carriage 19 for movement into and out of the light beam for purposes which will be described hereinbelow.

The optically active chemical solution contained in the test tube 18 causes the plane of polarization of the light beam passing therethrough to rotate about the optical axis Y—Y'. The extent of such angular rotation increases as the light beam progresses through the chemical solution and is a function of the optical rotary power of the solution. Spaced from the left end of the test tube 18 is another light-polarizing member or analyzer 21, which also may be a light-polarizing film, Nicol prism, or etc., whose plane of polarization $O-A_n$ coincides with the reference axis O—X. During passage through the solution, the plane of polarization of the light beam has been rotated by the angle $\theta$, the magnitude of the angle $\theta$ being a function of the optical rotary power of the solution, the length of the light path through the solution, the wave length of the light beam and the solution concentration. Consequently, the light amplitude vector indicated by the arrow $O-E_0$ on the polarizer 17 and coinciding with the polarizing axis of the polarizer, will be rotated by the angle $\theta$ as indicated by the arrow $O-E_\theta$ on the analyzer 21. The energy E of the light beam as it emerges from the analyzer 21 is proportional to the square of the light amplitude entering the polarizer 17 multiplied by the cosine of the phase angle, that is, the angle formed between the plane of polarization $O-P_1$ of the polarizer 17 and the plane of polarization $O-A_n$ of the analyzer 21. In the illustrated case, such phase angle equals $-\alpha+\theta$.

A light transducer 23, which may be a barrier layer photocell, transforms the light energy impinging on its sensitive surface into an electrical current proportional to the said light intensity. A suitable electrical indicating instrument 24, connected to the terminals of the photocell, measures the electric current produced by the photocell.

To measure the angle of optical rotation $\theta$ produced by an active chemical, the test tube 18', filled with a solvent, or distilled water, is moved into the light beam in order to standardize the output current of the photocell to a given value $I_0$, the polarizer 17 being, at such time, also disposed in the light beam. Various means are available for standardizing purposes, but it is preferable to accomplish this by rotating the photocell 23 about the vertical axis O—Z perpendicular to the polarization axis of the analyzer. Such standardizing procedure offers several advantages. It satisfies the required condition of invariance for the external ohmic resistance of the measuring circuit which can be kept as small as possible for linear response of the meter 24. Also, the rotation of the photocell cannot introduce any modification in the distribution and geometry of the light beam. Still further, the light amplitude vector OE of the light energy emerging from the analyzer 21, being perpendicular to the axis of rotation OZ of the photocell, remains always within a plane perpendicular to the surface of the photocell and thus cannot be reflected by the transparent covering normally disposed over the sensitive photocell surface for protective purposes.

After standardizing, that is, rotating the photocell to obtain a reference indication on the meter 24, the rack 19 is moved to substitute the test tube 18 for the test tube 18' in the light beam, such test tube 18 containing the optically active solution under test, and the corresponding electric current intensity $I_1$ is read on the meter 24.

Then, the polarizer 17' is inserted into the light beam in place of the polarizer 17, and after standardization as previously indicated, the new current intensity $I_2$ is read on the meter 24 with the test tube 18 in the light beam.

The second polarizer 17' is oriented so that its plane of polarization makes an angle $+\alpha$ with reference axis O—X. It will be noted that two polarizers 17 and 17' are oriented at equal and opposite angles $\alpha$ with respect to the axis O—X. The ratio, r, of the difference to the sum of the two readings of the meter 24 is, $$r = \frac{I_1 - I_2}{I_1 + I_2}$$

As described in detail in my above-referenced copending patent application, the angular rotation $\theta$ of the plane of polarization of the light beam passing through the substance in test tube 18 is given by the ratio of the difference to the sum of the two current readings, or, $$r = \frac{I_1 - I_2}{I_1 + I_2} = 2 \tan \alpha \theta - 2 \tan^3 \alpha \left(1 - \frac{1}{3 \tan^2 \alpha}\right)\theta^3 \quad (1)$$

where, $\theta$ is in radians, and
$I_1$ and $I_2$ are the measured light values as given above.

The sensitivity of the system depends upon the selected angle $\alpha$ so that even for a relative short solution path $l$ the angle $\theta$ can be amplified to a degree such that in most cases it is not necessary to amplify the output current of the photocell.

The above-described apparatus entails successive manipulations to place and remove the two polarizers 17 and 17' into and out of the light beam, also the different test tubes containing the solvent and the test solution. Although the slidable rack 19 facilitates such manipulation, the arrangement is relatively slow in operation and cannot be used for instantaneous control.

However, by appropriate modification of certain components, the apparatus can be made to indicate directly the sum and the difference of the two output currents of the photocell. The basic design remains the same and includes a modification of the polarizer arrangement. One such arrangement is shown in FIGURE 2. Interposed in the light beam, traveling in the direction Y—Y', is a screen 26 having formed therein a square opening $a, b, c, d$ that is centered about the optical axis. The two polarizers 27, 27', whose respective axes of polarization $OP_1$ and $OP_2$ make the respective angle $+\alpha$ and $-\alpha$ with respect to the direction O—X of the analyzer 28, are rigidly mounted side by side in a supporting frame 29. The polarizers are in intimate edge contact with each other at the parting line MN which normally passes through the optical axis Y—Y'. The frame 29 may be supported by a system of four (4) cantilever springs 30, secured in fixed position on the lower ends, and the cross bars 31. A magnetic plunger 32 that has one end secured to the frame 29 is adapted for attraction by a solenoid coil 33 when energized by a source of alternating current. Upon energization of the coil 33, the frame 29 is moved out of its equilibrium position and vibrates in a harmonic motion centered about the optical axis Y—Y'. In such arrangement, the four cantilever springs are subjected to equal elastic deformations whereby the frame 29 oscillates in a direction perpendicular to the axis Y—Y' at a frequency governed by the spring rate and the mass of the elastically supported components, such frequency being equal to, or nearly equal to, the frequency of the current energizing the solenoid coil. It is convenient to introduce enough viscous damping into the oscillating system to avoid high critical tuning. The alternating current intensity energizing the coil 33 is adjusted, by conventional means, to make the amplitude of the harmonic motion such that the parting line MN, between the polarizers 27, 27', travels alternately from the edge $ad$, of the opening in the screen 26, to the edge $bc$.

A vessel 34, containing the active solution to be tested, is located in the light beam between the polarizers and the analyzer 28. As in the FIGURE 1 embodiment of the invention, the light beam emerging from the analyzer 28 strikes the active surface of the photocell 23 and is converted into a corresponding electrical output.

In the arrangement shown in FIGURE 2, it is important that the frame 29 oscillate along the axis O—X perpendicular to the optical axis Y—Y' without rotation. In an alternative arrangement, the solenoid-plunger can be replaced by an electric motor driving a crank and connecting rod combination.

The functioning of the system will readily be understood by examining FIGURE 3. In a practical sense, the light beam striking the photocell is a mixture of the O—X components of the two beams polarized at the angles $-\alpha+\theta$ and $+\alpha+\theta$, where $\theta$ is the optical angular rotation of the solution under test. Thus, the total light energy reaching the photocell becomes, $$E = A_0^2 d [\cos^2(-\alpha+\theta)(a-x) + \cos^2(\alpha+\theta)(a+x)] \quad (2)$$

where, $A_0$ = amplitude of the light vibration,
$d$ = the vertical width of the screen opening $a, b, c, d$ (shown in FIGURE 2),
$a$ = the amplitude of the harmonic motion of the polarizers, and
$x$ = the instantaneous position of the parting line MN with respect to the center of the opening in the screen.

Since the distance $x$ represents the amplitude of the harmonic motion at any instant, then, $$x = a \sin \omega t$$

inasmuch as the maximum amplitude is made, by adjustment, equal to one half of the length $a-b$ of the opening in the screen.

Developing the Expression 2 of the energy impinging on the sensitive surface of the light transducer, we obtain, $$E = A_0^2 da (1 + \cos 2\alpha \cos 2\theta - \sin 2\alpha \sin 2\theta \sin \omega t) \quad (3)$$

This expression of the resultant energy is of particular interest as it contains the quantity, $$A_0^2 da (1 + \cos 2\alpha \cos 2\theta) \quad (4)$$

which is equal to the sum of the intensities, $E_1 + E_2$, of the light energies corresponding, respectively, to the planes of polarization of the polarizers multiplied by a fixed factor $da$. The product $da$ is equal to the surface area of the opening $a, b, c, d$ in the screen and may be referred to as the D.C. component of the current output of the photocell. On the other hand, the term, $$-A_0^2 da \sin 2\alpha \sin 2\theta \sin \omega t \quad (5)$$

represents the harmonic oscillation whose maximum amplitude equals the difference $E_1 - E_2$ of the light transmitted energies with the polarizer orientation $P_1$ and $P_2$, respectively, by a constant factor $da$ (equal to the surface area of the screen opening) and represents the A.C. component of the current output of the photocell.

In FIGURE 1, the D.C. meter 24 will measure only the D.C. current component $A_0^2 da(1 + \cos 2\alpha \cos 2\theta)$. The A.C. component cannot affect the meter indication since the angular velocity $\omega$ may be made very large in comparison to the natural frequency of the movable system of the meter while its time integral over a complete cycle remains equal to zero.

In FIGURE 2, however, the output terminals of the photocell 23 are connected to the primary winding of a transformer having its secondary winding connected to a full wave rectifier bridge 36. The output terminals of the rectifier bridge are connected to the D.C. indicating meter 24. Thus, the amplitude of the rectified current, $i$ (proportional to the A.C. current in the transformer primary winding), as indicated by the meter 24, will be in terms of the mean average, such that, $$i_{\text{avg}} = \frac{2}{\pi} i$$

This means that the average current, $i_{\text{avg}}$, is proportional to the difference $E_1 - E_2$ sought to be measured. It will be seen, therefore, that by adding in the external circuit of the photocell a transformer feeding a D.C. meter through a rectifier bridge, there is obtained, at the same time, the sum and the difference of the polarized light amplitudes. With this arrangement, then, it is no longer necessary to standardize the apparatus, as is the case in the FIGURE 1 arrangement. The test tube containing the optically active substance remains in the light beam at all times. Also, since the difference and the sum of the two light amplitude factors are obtained at the same time, and under constant optical conditions, the ratios of the two measured quantities eliminates the influence of light absorption by the substance. Also, since the ratio of the difference to the sum is independent of absolute values, the mean output current, as measured by the meter, may be increased to substantially the full scale value of the meter, thereby affording increased accuracy of the results.

However, as described to this point, the system is not discriminatory of the sign of the optical rotation. This sign, when unknown, must be determined by an appropriate procedure readily carried out by instrumentation, as will be described hereinbelow.

The use of the transformer in the FIGURE 2 system may be deemed unsatisfactory in certain applications because of the phase angle resulting from the complex impedance thus introduced into the circuit of the photocell. To eliminate this factor, a modification of the FIGURE 1 and FIGURE 2 measuring circuits may be utilized. Referring again to FIGURE 1, there is incorporated a second light transducer (photocell) 23' receiving a beam of light from the common source 10, through a condensing lens 40 and a monochromatic filter 41. This light beam travels in a direction perpendicular to the general light beam axis Y—Y'. The photocell 23' is connected to terminals $T_1$ and $T_2$.

The measuring circuit for use with the modified FIGURE 1 system is shown in FIGURE 4. The circuit is shown with input terminals $T_1, T_2$ (corresponding to the similarly marked output terminals of the auxiliary photocell 23' of FIGURE 1) and input terminals $T_3, T_4$ (corresponding to the similarly marked output terminals of the primary photocell 23 of FIGURE 1). The output current $I+i$, delivered by the primary photocell 23, travels in the same direction as the output current $I'$ furnished by the auxiliary photocell 23'. In other words, the plus (+) terminal of one photocell is electrically connected to the minus (—) terminal of the other photocell. The D.C. meter 24, therefore, measures the average current flowing between the circuit terminals $T_3, T_1$. A rectifier bridge 36' is connected across the circuit terminals, as shown, and feeds a rectified current component $i$, of the current delivered by the primary photocell 23, into the D.C. meter 24'.

From what has been described hereinabove, it will be apparent that the instantaneous current through the meter 24 represents the function, $$I + i = A_0^2 da(1 + \cos 2\alpha \cos 2\theta) - A_0^2 da \sin 2\alpha \sin 2\theta \sin \omega t \quad (6)$$

Consequently, the meter 24 measures, at any instant, the D.C. component $$I = A_0^2 da(1 + \cos 2\alpha \cos 2\theta)$$

which is proportional to the sum of the light intensities $E_1 + E_2$ to be determined.

The A.C. component, $$i = -A_0^2 da \sin 2\alpha \sin 2\theta \sin \omega t$$

whose integral over a complete cycle remains zero (0) cannot be measured by the meter 24.

Now, the total current flowing through the rectifier bridge is made up of the algebraic sum of the currents $I+i$ and $I'$, such that the resultant instantaneous intensity becomes, $$I_r = (I+i) - I'$$

Therefore, by adjusting the current $I'$, produced by the auxiliary photocell 23', to satisfy the equality $I-I'=0$, only the A.C. component $i$ of the output of the auxiliary photocell 23' will pass through the rectifier bridge and the meter 24'. This meter 24', therefore, will measure the mean average of the current $i$ over a complete cycle, $$i_{avg} = A_0^2 da \sin 2\alpha \sin 2\theta \frac{1}{T} \left[ \int_0^{T/2} \sin \omega t \, dt - \int_{T/2}^0 \sin \omega t \, dt \right]$$

(7)

Thus, the indications of the meter 24' are proportional to the difference $E_1 - E_2$ to be determined.

The appearance of the factor $2/\pi$ in the expression of $i_{avg}$ may be troublesome in the computation of the difference to sum ratio, $r$. However, by making the sensitivity of the meter 24' equal to $\pi/2$ times the sensitivity of the meter 24, the difficulty vanished entirely and the ratio $r$ is exactly expressed by, $$r = \frac{E_1 - E_2}{E_1 + E_2} = \frac{i \text{ (flowing in meter 24')}}{I' \text{ (flowing in meter 24)}} \quad (8)$$

Naturally, the output current $I'$ of the auxiliary photocell 23' must be exactly adjusted to cancel the D.C. component of the output current of the primary photocell 23. This operation can be performed at any instant since the indications of the meter 24', as a result of the rectifier bridge 36', measures the function, $$I_{avg} = \sqrt{(I-I')^2} + \frac{2}{\pi} A_0^2 da \sin 2\alpha \sin 2\theta \quad (9)$$

Thus, the matching of $I$ and $I'$ requires only the adjustment of the photocell 23' to obtain the minimum of the stated function. The photocell 23' may be motorized to seek the required minimum condition.

The measuring circuit shown in FIGURE 4 necessitates taking a reading of the two meters 24 and 24' in order to obtain the ratio of the difference to the sum of the energies of the light beam emerging from the analyzer. Other measuring circuits may be used in order to obtain a direct reading of such ratio and one circuit suitable for this purpose will now be described.

Reference is made to FIGURE 5 which is a schematic diagram of a single instrument providing a direct indication of the ratio $$\frac{E_1 - E_2}{E_1 + E_2} = \frac{i}{I_{avg}}$$

Basically, the meter is provided with two stationary field systems consisting, respectively, of the field coils $C_1$, $C_2$ and $C_3$, $C_4$ arranged in such manner that their axes are perpendicular to each other. The coils $C_1$ and $C_2$ are connected in series to produce a magnetic field having an intensity $H_{I_{avg}}$ directed along the axis $y$—$y'$, while the coils $C_3$ and $C_4$, also connected in series produce a magnetic field having an intensity $H_{i_{avg}}$ directed along the axis $x$—$x'$. It is here pointed out that the suffixes $I_{avg}$ and $i_{avg}$ are here used to facilitate an understanding of how the meter functions with respect to the current markings shown in FIGURE 4. Specifically, the field coils $C_1$ and $C_2$ of the FIGURE 5 meter are connected into the measuring circuit of FIGURE 4 at the terminals $J_1$ and $J_2$ to replace the meter 24 and the coils $C_3$ and $C_4$ are connected to the terminals $J_3$ and $J_4$ to replace the meter 24'.

The magnetic field $H$ created by the two field coils systems represents the vectorial sum of the two orthogonal field components, that is, $$\vec{H} = \vec{H}_{I_{avg}} + \vec{H}_{i_{avg}}$$

A movable coil M, rotatable about an axis perpendicular to the plane of the axes $x$—$x'$ and $y$—$y'$, is supplied a constant current from a suitable voltage source such as the battery $e$ thereby creating a magnetic field vector of intensity $H_0$ which creates a restoring torque $$\vec{U} = \vec{H}\vec{H}_0 \sin \gamma \quad (10)$$

bringing the coil M in a plane perpendicular to the vector H. The angle $\gamma$ is formed by the angular distance between the two vectors H (resultant of the two field coil vectors) and $H_0$ (movable coil vector). When the angle becomes nil the restoring torque vanishes, otherwise the restoring force is practically proportional to the angular displacement $\gamma$ for small amplitudes. The angular position of equilibrium $\alpha$ of the movable coil is thus given in all cases by, $$\tan \alpha = \frac{\vec{H}_{i_{avg}}}{\vec{H}_{I_{avg}}}$$

since at this position $$\vec{U} = \vec{H}\vec{H}_0 \sin \gamma = 0$$

through $\gamma = 0$.

The measure of the angle $\alpha$ is thus related to the ratio of the difference to the sum since, $$H_{i_{avg}} = B''N''i_{avg}$$
$$H_{I_{avg}} = B'N'I_{avg}$$

where B' and B'' are factors governed by the mechanical size of the coils and N', N'' are the number of turns of the field coil systems.

Thus, $$\tan \alpha = \frac{B''N''i_{avg}}{B'N'I_{avg}}$$

It is apparent that the sensitivity of the instrument may be varied by adjusting the parametric ratio $$\frac{B''N''}{B'N'}$$

The value of $\tan \alpha$ remains unaffected by the absolute values of the currents $i_{avg}$ and $I_{avg}$ since the magnitude of both currents depends upon the intensity of the single light source 10, see FIGURE 1. Obviously, the light source may fluctuate without causing any change in the ratio $$\frac{i_{avg}}{I_{avg}}$$

Further, the D.C. current intensity flowing through the movable coil M does not reflect upon the measurement of the angle $\alpha$ and its magnitude may be adjusted to vary the restoring force and to provide a desired degree of damping. The alternating current component introduced into the field coils $C_1$ and $C_2$ does not affect the angular position $\alpha$ since it corresponds to a zero average field component. In practice, the instrument may be shielded against the earth's magnetic field and a pointer secured to the movable coil may deflect over a scale calibrated directly in terms of $\theta$, the optical rotary power of the solution being tested.

The arrangements illustrated in FIGURE 2 wherein the plane of polarization of a light beam is shifted at a constant frequency within a range defined by equal positive and negative angles with respect to the plane of polarization of a fixed analyzer, are useful for determining the optical rotation of the light beam by a solution under test. As is apparent from Equation 1, above, and as is described in detail in my co-pending application Serial No. 654,929, the possible range of measurable optical rotation decreases with increase in the tangent of the angle $\alpha$.

When it is desired to determine, with extreme accuracy, the departure of an active chemical from a known level of concentration, it is convenient to make the angle formed between the reference axis OX and the planes of polarization of the polarizers 17, 17' (FIGURE 1) such that, $$\text{angle } XOP'_1 = -\alpha - \left(\theta_0 - \frac{\Delta\theta}{2}\right) = \alpha_1 \qquad (11)$$

$$\text{angle } XOP'_2 = +\alpha - \left(\theta_0 - \frac{\Delta\theta}{2}\right) = \alpha_2 \qquad (12)$$

where, $\alpha$ is the angle corresponding to the selected amplification factor, tan $\alpha$, $\theta_0$ is the optical rotation angle corresponding to the reference concentration of the active chemical, and $\frac{\Delta\theta}{2}$ is half the range of the possible total absolute variation $\Delta\theta$ of the optical rotation to be measured.

This arrangement offers a considerable increase in the relative accuracy or sensitivity in the determination of the variation of the optical rotation about a predetermined level $\theta_0$.

It has been indicated that the sensitivity of a system for the measurement of optical rotation is given by, $$d\theta = \frac{1}{2\tan\alpha} \times \frac{dE}{E}$$

For a given sensitivity $dE/E$ in the measurement of the light energy output (which is determined by the particular meter used) and one can decrease the value of the $d\theta$, and thus increase the sensitivity by selecting a larger value of tan $\alpha$. However, when the angle $\alpha$ tends toward 90° the range of measurement which is equal to 90°−$\alpha$ tends toward 0°. Hence, the relative sensitivity achieved can be expressed in terms of the range of measurement $\theta_r$, $$\frac{d\theta}{\theta_r} = \frac{1}{2\left(\frac{\pi}{2}-\alpha\right)\tan\alpha} \times \frac{dE}{E}$$

The factor $$\left(\frac{\pi}{2}-\alpha\right)\tan\alpha$$

in the denominator tends toward the undetermined product $0 \times \infty$ when $\alpha$ reaches $$\frac{\pi}{2}$$

This indeterminate factor can be resolved by expressing it as, $$\frac{\left(\frac{\pi}{2}-\alpha\right)}{\left(\frac{1}{\tan\alpha}\right)} = \frac{-1}{\frac{-1}{\cos^2\alpha\tan^2\alpha}} = \sin^2\alpha$$

Hence, the relative sensitivity $$\frac{d\theta}{\theta_r}$$

reaches the value, $$\frac{d\theta}{\theta_r} = \frac{1}{2\sin^2\alpha} \times \frac{dE}{2E}$$

and when $\alpha$ approaches $$\frac{\pi}{2}$$

the relative sensitivity becomes, $$\frac{d\theta}{\theta_r} = \frac{dE}{2E}$$

In other words, the relative sensitivity becomes limited to a fixed factor, $$\frac{dE}{2E}$$

which factor is independent of the amplification factor $2\tan\alpha$. Such limitation, however, can be overcome by the introduction of an initial level of optical rotation, $\theta_0$, and measuring the variations around such level. In such case the relative sensitivity is expressed by, $$\frac{d\theta}{\theta_0 \pm \frac{1}{2}\left(\frac{\pi}{2}-\alpha\right)} = \frac{1}{2\left[\theta_0 \pm \frac{1}{2}\left(\frac{\pi}{2}-\alpha\right)\tan\alpha\right]} \times \frac{dE}{E}$$

Thus, when $$\frac{\pi}{2}-\alpha$$

approaches 0 and tan $\alpha$ reaches infinity, the relative sensitivity becomes, $$\frac{d\theta}{\theta_0} = \frac{1}{2\theta_0\tan\alpha} \times \frac{dE}{E}$$

where the factor $$\frac{1}{2\tan\alpha}$$

is preserved. It is obvious, then, that the relative sensitivity increases also with the value $\theta_0$ of the initially selected level. Yet, to permit the measurement with an initial angular level $\theta_0$ larger than $$\frac{\pi}{2}-\alpha$$

the angular orientation of the polarization planes $OP_1$ and $OP_2$ of the respective polarizers 17 and 17' (see FIGURE 1) must be modified in order that the algebraic sum of their angular positions, when added to the initial level of optical rotation $\theta_0$, becomes equal to the required initial phase angle $\alpha$. Further, if the optical rotation of the test solution varies around the level $\theta_0$ by $$\pm \frac{\Delta\theta}{2}$$

it is convenient to make the reference angle level $$\theta_0 = \frac{\Delta\theta}{2}$$

in which case the difference to the sum ratio remains of the same sign over a range $$-\frac{\Delta\theta}{2} \text{ to } +\frac{\Delta\theta}{2}$$

of the variation of the optical rotation. The range $\Delta\theta$ of the said variation must remain smaller than the angle $$\frac{\pi}{2}-\alpha$$

For example, assuming a reference, or initial, optical rotation level of +1 radian and a possible variation of ±0.005 radian about such level, one may select an amplification factor, tan $\alpha$=50. Thus, the orientation plane $OP_1$ of the polarizer 17 (FIGURE 1) will be $$\alpha_1 = -88°55'15''$$

that is, 1 radian −0.005 radian. Similarly, the orientation plane of the polarizer 17 will be $$\alpha_2 = +88°55'15''$$

Carrying this thinking over to the vectorial diagram of

FIGURE 6, upon adding to the polarizer's initial angle $XOP'_1$ and $XOP'_2$ the angular rotation $$\theta_0 - \frac{\Delta\theta}{2} = 1 - 0.005 \text{ radians}$$

produced by the optically active medium to be measured or controlled, one reestablishes the required orientations $-\alpha$ and $+\alpha$ of the vectors $OP_1$ and $OP_2$ representing the amplitude and direction of the polarized light emerging from the medium.

Any deviation $\Delta\theta$ from the reference value, which causes the vector $OP_1$ to come to $OA_1$, and the vector $OP_2$ to come to $OA_2$, will be measured in terms of the difference to sum ratio as an angular quantity independent of the reference level.

The relative sensitivity becomes close to $$\frac{d\theta}{\theta_0} = \frac{1}{100} \times \frac{dE}{E}$$

and with $$\frac{dE}{E}$$

of the order of 0.001 it is possible to control or measure a deviation $d\theta$ as small as one part in one hundred thousand.

Figure 7:
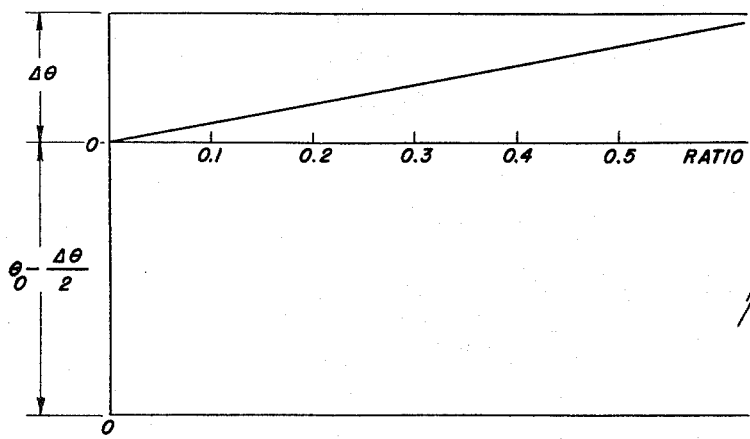
FIGURE 7 is a corresponding curve illustrating the deviation measurement at a given optical rotation $\theta$.

The curve of FIGURE 7 represents the results of such procedure which is equivalent to a predetermined displacement of the ordinates origin. The zero of the scale is brought to coincide with the angular value $$\theta_0 = \frac{\Delta\theta}{2}$$

while preserving the measurements units in the ratio $r$ and the angle $\theta$.

The system of two polarizers, as shown in FIGURE 2, placed side-by-side in an oscillating frame to alternately produce the polarization along two different planes making, respectively, the angles $+\alpha$ and $-\alpha$ with the reference axis OX can be modified to practical advantage. Certain crystaline substances, such as quartz crystal, rotate the plane of polarization of a light beam traversing them either to the right or the left. The amount of the angular rotation depends upon the length of the light path through the crystal, its nature and the light wave length.

Thus, if one replaces the two polarizers 27 and 27' of FIGURE 2 by two plates of quartz cut perpendicular to the optical axis of the crystal, one made of left handed quartz and the other of right handed one, and both plates of such thickness as to produce the required absolute rotation $\alpha$, then only one polarizer proceeding the oscillating frame is necessary.

FIGURE 8 represents, in a diagrammatic sense, such modified arrangement of the light polarizing members. Here two quartz plates 44, 45 would be mounted in the oscillating frame, such as the frame 29 shown in FIGURE 2. The plate 44 rotates the plane of light polarization to the left, whereas the plate 45 rotates the plane of light polarization to the right. Both plates are of equal thickness to produce the same absolute rotation $\alpha$. Associated with the quartz plates is a single, fixed polarizer 46 which has its plane of polarization OP' parallel to the reference axis OX. As in FIGURE 2, the screen 26 is provided with a rectangular window 47 centered on the general optical axis. In the assembled apparatus, the screen 26 is placed in close proximity to the oscillating frame carrying the quartz plates 44, 45 with the polarizer 46 disposed between the screen and the plates.

Therefore, the light beam passing through the screen window 47 and the polarizer 46 becomes polarized along the direction OX perpendicular to the plane OZ—OY. While traversing the quartz plates 44 or 45, placed after the polarizer 46, the direction of the polarized light amplitude progressively rotates to reach a final angular position $+\alpha$ or $-\alpha$ depending upon the sign of the said plates, either dextrogyre or sinistrogyric. After emerging from the quartz plates the polarized light enters the optically active chemical contained in the vessel 34, see FIGURE 2, and the system operates in the same manner as previously explained.

This arrangement leads also to the same methods of measurement for the sum and the difference of the electric current intensities. Although the performance, amplification factor, sensitivity, etc., remain equal to those of the FIGURE 2 arrangement, this system offers new possibilities to measure, record or transmit the extent of the optical rotation of a light beam traversing an active substance.

Reference is now made to FIGURE 9, representing the vector diagram of the system utilizing quartz plates as shown in FIGURE 8. The angular position of the axes $O_1P_1$ and $O_1P_2$ of the polarized light vibrations after emerging from the quartz plates depend upon the thickness of the said plates and the initial angle $\gamma$ which the axis $O_1P$ of the polarizer makes with the reference axis OX. The angles $-\alpha$ and $+\alpha$ are fixed for a certain dimension of the thickness but the angle $\gamma$ can be varied when the polarizer is mounted on a rotatable support. Therefore, if one rotates the polarizer by an angle $\gamma$ the two vectors $OP_1$ and $OP_2$, making with OP the fixed phase angles $-\alpha$ and $+\alpha$, will rotate by the same angular amount and reach their new respective positions $O_1P'_1$ and $O_1P'_2$.

Hence, before entering the active chemical, the planes of polarization of the two beams form the phase angles $-\alpha+\gamma$ and $+\alpha+\gamma$ with the reference axis OX, which is also the axis of the analyzer $A_n$, see FIGURE 10. After traversing the optically active substance those said beams emerge with their planes of polarization rotated by the same amount of optical rotation $\theta$ and their respective amplitude vectors take the indicated positions $O_4A_1$ and $O_4A_2$ as shown in FIGURE 10. The energies of the light beams passing through the analyzer are, as previously indicated, proportional to the square of the amplitude vector components along the OX axis. Those energies are expressed by:

$$E_1 = A^2_1 \cos^2(-\alpha+\gamma+\theta) \text{ and } E_2 = A^2_2 \cos^2(\alpha+\gamma+\theta) \quad (13)$$

The absolute amplitudes $A_1$ and $A_2$ are equal (the light path length through the solution remains constant, thus, the light absorption, if any, remains the same for each one of the two rays) and the measured differences, proportional to the A.C. component of the light transducer output gives, $$i_{avg} = E_1 - E_2 = A^2 \cos^2(-\alpha+\gamma+\theta) - \cos^2(\alpha+\gamma+\theta) \quad (14)$$

This equation indicates that the difference $i_{avg}$ may be made equal to zero for any optical rotation produced by a chemical, the angle $\gamma$ being adjusted to satisfy the relationship $$\gamma = -\theta$$

by an appropriate angular rotation of the polarizer 46, FIGURE 8.

Thus, in this method and apparatus for the measurement of the angle $\theta$ of optical rotation, the polarizer is rotated in the proper direction until the A.C. component of the photocell output completely vanishes. The corresponding polarizer angular position $\gamma$ equals the optical rotation in absolute value but takes the opposite sign. The method and the instrumentation not only measure the value of the angle but is discriminative with respect to its sign.

The sensitivity of the method remains governed by the basic relationship established by the difference to the sum ratio $$\frac{dE}{E} = 2 \tan \alpha \times l \times d\theta \quad (15)$$

in which $dE$ represents the smallest detectable A.C. output measured by the meter 24' of FIGURE 4, E the D.C. component measured by the meter 24, $l$ the length of the light path in cm., and $d\theta$ the optical angular variation.

But, since the measurement of $\theta$ becomes dependent upon a zero (0) current method, the meter 24' may be replaced by a high sensitivity galvanometer. For example, for a D.C. current component of 50 microamperes in the meter 24, the sensitivity of the galvanometer may be chosen at 0.005 microampere per division of its scale, yielding with tan $\alpha = 5$ and $l = 20$ cm., a final sensitivity of $$d\theta = 5 \times 10^{-7} \qquad (16)$$

or $\tfrac{1}{10}$ of a second arc. Comparing this result against the sensitivity of some 40 seconds achieved with the optical polarimeters a 400/1 ratio is thus secured in favor of the photo-electric method described.

The sensitivity and accuracy of this new instrument becomes solely limited by the ability to read or measure the angle $\gamma$ by which the polarizer 46 must be rotated in to make the A.C. component of the photocell output equal to zero.

The method possesses other valuable advantages. The selection of a high amplification factor, tan $\alpha$, does not restrict the useful range of optical rotation to the previously indicated range of $\theta_0 = 90 - \alpha$; there is no limiting value. The instrumentation lends itself to extremely high precision when comparing the optical rotation of several active chemicals. For this purpose, the carriage 19 of FIGURE 1 permits a rapid change from one chemical to another. The resolving power of $5 \times 10^{-7}$ permits the measurement of physical constants of optical or magnetic rotation with a precision of the order of six exact figures.

However, the precision of the method is limited by the accuracy with which the angle of rotation $\gamma$ of the polarizer can be determined. For extreme precision and scientific work the polarizer may be rigidly mounted on a goniometric disc of suitable diameter carrying angular divisions in degrees, half degrees, or less, observed through a $\times 100$ magnification microscope fitted with a micrometric ocular reticle as normally used in metrology for the measurement of arc.

FIGURE 11 shows the selected arrangement for scientific work. A cylindrical sleeve 47 carries, centered on its axis, a Nicol prism 46 maintained in position by means of set screws and pressure plates. This sleeve 47 rotates within an outer sleeve 48 supported by the frame or pedestal, $f$, of the instrument. The inner and outer sleeves are provided with bearing surfaces, one of them being tapered, as shown, to secure exact concentricity. A washer and thrust bearing assembly 48' permit an axial preloading of the tapered bearing surfaces to prevent axial play. The most precise construction calls for spherical bearing surfaces optically polished between which a great number of precalibrated balls are inserted.

At one end, the sleeve 47 is provided with a flanged disc 49 which supports a circular crown, or disc, 51 made of plane-parallel glass plate engraved, on one of its faces, with extremely fine radial lines of angular divisions. By means of diamond engraving the width of the lines is of the order of the micron. An illuminating system including a light source 52, a condenser represented by the lenses 53 and 55, and a 45° prism 54, illuminates the divisions on the glass plate 51.

The division lines are observed by means of $\times 100$ magnification, distortion free, microscope including an objective 56, a 45° prism 57, a wide field ocular 59 and micrometric reticle 58 located at the ocular focal plane; see also FIGURE 12. By means of the graduated knob 62 and its micrometric screw engaging the threaded nut 60 of a sliding carriage supporting the engraved reticle 58, one may bring one set of the double lines 71, see FIGURE 13, representing the field of view, in such a position as to place the image of a division line 69 of the glass disc 51 exactly at equal distances from each one of the two lines 71. A series of triangular marks 70 are engraved on a fixed transparent plate placed close to the reticle 58. These serve to divide the interval of one division of the disc 51 into ten exact parts, for instance. Each interval 70 corresponds to a complete turn of the micrometric drum 62, divided for instance in 180 equal parts, each division therefore representing one second of arc. The sensitivity of reading is further increased by means of the vernier 63. The screw 62 cannot be displaced axially on account of the thrust bearing 61 while the backing spring 64 prevents any backlash.

Looking at the reticle 58, FIGURE 13, the image of the line identified by the numeral 69 corresponds to the divisional marking of 27°30' on the glass disc 51 (FIGURE 11). Since such line 69 lies beyond the triangular marking 70 carrying the identification 15', 15 minutes must be added to the prime setting 27°30' making the reading 27°45'. By reference to the dial 62, FIGURE 12, it will be noted that the scale is displaced 43" (seconds of arc) and that the marking on the dial 62 which is in precise alignment with a marking on the vernier scale 63 is 8 units displaced from the vernier zero. Therefore, the reticle 58 has been shifted an additional amount corresponding to 43.8 seconds, whereby the actual precise angular rotation of the polarizer 46 (FIGURE 11) is 27°45'43.8".

In the FIGURE 11 showing, the relative orientation of the polarizer, screen and quartz plates has been changed from that shown in FIGURE 8. Specifically, in FIGURE 11, light rays from the source are directed into the sleeve 47 through the diverging lens 16 and the resulting parallel beam passes through the angularly adjustable polarizer 46. Upon emerging from the sleeve 47, the polarized light beam passes through the window 47, in the screen 26, and then through the quartz plates, only the quartz plate 44 being visible in the particular view of FIGURE 11. After passing through the quartz plates, the light beam is passed through the solution under test, through the analyzer, and to the active surface of the light transducer, such as the photocell 23 shown in FIGURE 1.

Referring again particularly to FIGURE 11, the complete assembly comprising the polarizer 46, sleeve 47 and disc 51 is rotatable as a unit by means of the knob 65 through a worm 66 and worm wheel 67, the latter being securely keyed to the sleeve 47 by means of the retaining collar 68. It will be apparent, that the knob 65 may be replaced by an electric motor and that the engraved disc 51 can be supplemented or replaced by a high precision electronic resolver of conventional design.

My improved polarimetric apparatus and method involving the rotation of the polarizer to measure the optical rotation does not require any special precaution for the stabilization of the light source. Further, photo multipliers with their advantage of considerable gain can be used without the need of a highly stabilized D.C. power supply since the method works on the principle of nul A.C. components in the light transducer output.

When the light transducer has its sensitive surface perpendicular to the general optical axis of the instrument and is not rotated about the vertical axis OZ for standardization purposes, the measurement of the optical rotation can be performed by rotation of the analyzer instead of the polarizer. In such case, the analyzer would be mounted for measured rotation on the mechanism shown in FIGURE 11 and the single polarizer would remain fixed. Such rotatable analyzer arrangement is particularly useful in certain applications as, for example, in determining the variation of a sugar solution from a predetermined, desired level of, say, 20% concentration. In such system, the analyzer is rotated to completely balance out the D.C. component of the photocell output at an angle $\theta$ corresponding to the optical rotation of a 20% sugar solution. This permits the use of very large values for tan α without reversal of the sign of the angle. The measurement of changes in θ, corresponding to solution deviation from the 20% concentration, is made by any of the measuring circuits already described.

The alternate shifting of the axis of polarization of the light beam can conveniently be obtained by means other than the ones already described.

When using a set of two polarizers placed side by side in an oscillating frame, as shown in FIGURE 2, rotation of the polarizers must be completely eliminated. Even a slight mechanical rotation of the said polarizers would reflect upon the measurement of the optical rotation since the precision of the measurement depends upon the exact phase angle between polarizer and analyzer. On the contrary, with the dextrogyral and sinistrogyric quartz plates, as shown in in FIGURE 8, the instrumentation becomes entirely insensitive to mechanical rotation of the supporting frame; the angular rotation of the plane of polarization of the light beam passing through the said quartz plates depending solely upon their thickness.

Since a rotation of a phase shifting quartz plate cannot cause an angular variation of the direction of the light polarization one may replace the described oscillating motion of the plates by a rotational motion which generally is simpler to realize in a practical sense.

The arrangement shown in FIGURES 14 and 15 utilizes this insensitivity to the mechanical rotation. Arcuate segments 75, 76 made, respectively, of left and right handed quartz plates of appropriate thickness to produce the desired rotations $+\alpha$ and $-\alpha$ are placed alternately side by side to form a solid continuous disc. These segments are centered on a flanged disc or hub 77 keyed to a motor-driven rotating shaft 78. The front flange 79, also centered on the same hub, maintains firmly in position the quartz segments by means of mechanical pressure developed by mounting screws, not shown. The use of appropriate cement at the two metal-quartz interfaces increases the mechanical rigidity of the assembly. Where high angular velocity must be attained, a steel ring can be fitted at the periphery of the quartz sectors after accurate grinding of the circular edge. Bonding the ring to the quartz by means of chemical cements achieves a rigid and strong assembly.

In the present arrangement, the contour of the opening in the screen 26′ must be modified from that shown in FIGURE 2. Specifically, the arcs of circles ab, and cd made concentric with the shaft axis, and two radial segments ad and bc form the contour of the opening 47. When the wheel rotates, the radial parting line MN between two adjacent quartz segments sweeps the clear opening. As a result, the light beam traversing the system contains a mixture of light polarized respectively at the angles $+\alpha$ and $-\alpha$ and this mixture varies as a time function.

When the angular distance Φ, corresponding to the angular length of one quartz segment, exceeds the angular distance φ, separating the radial edges ad and bc of the opening 47, an angular position of the rotating wheel exists at which only one kind of polarized light may pass through the system. Thus, the output current furnished by the light transducer follows the curve shown in FIGURE 16, representing the electric current output vs. the angle of mechanical rotation of the wheel proportional to the time. The horizontal lines BC, DE, FG represent the maximum and minimum output of the transducer occurring when the free screen aperture becomes fully covered by one single quartz element. The straight inclined lines AB, CD, EF, indicate the transition from one angle of polarization to the other one. This transition is linear with respect to the time, being given by, $$I = A^2 \cos^2(-\alpha+\theta)(adMN) + A^2\cos^2(\alpha+\theta)(MNbc) \quad (17)$$

while the surfaces (adMN) and (MNbc) take the values, $$(adMN) = (R_2^2 - R_1^2)\omega t \quad (18)$$

$$(MNbc) = (R_2^2 - R_1^2)(\varphi - \omega t) \quad (19)$$

where, $A$ = amplitude of the light vibration,
$\alpha$ = initial phase angle between the light polarization planes of the polarizer and analyzer,
$\theta$ = angular rotation of the plane of polarization,
$adMN$ = clear surface passing light polarized at the angle $+\alpha$,
$abdc$ = total surface defining the light beam contour,
$MNbc$ = clear surface passing light polarized at the angle $-\alpha$,
$R_1$ and $R_2$ = the respective radii of the arcs ab and cd.

The resulting electric current output of the transducer is no longer a simple harmonic function of time but it still represents the sum of the D.C. and A.C. components.

The D.C. component remains equal to the half sum of the maximum and minimum values of the electric current output, as previously stated and as indicated in FIGURE 16, $$I_{dc} = \frac{I_{max} + I_{min}}{2}$$

Since any periodic function can be developed into a Fourier's series of harmonic functions, the A.C. current component appears as, $$I_{ac} = A_1 \cos(\omega t + B_1) + A_2 \cos(2\omega t + B_2) \ldots$$
$$= \sum_1^n A_n \cos(n\omega t + B_n) \quad (20)$$

where, $A_1$ = amplitude of the fundamental harmonic oscillation of the periodic function,
$A_n$ = amplitude of the harmonic component of rank $n$,
$B_1$ = phase angle of the fundamental harmonic oscillation,
$B_2$ = phase angle of the harmonic oscillation of rank 2,
$B_n$ = phase angle of the harmonic oscillation of rank $n$.

The angle Φ of the quartz segments and the angular speed of rotation $\omega_0$ of the disc define the fundamental periodicity of the function:

$$T = \frac{2\Phi}{\omega_0} = \frac{\Phi}{\pi \text{ r.p.s.}} \quad (21)$$

Therefore, the meter 24′, FIGURE 4, through the rectifying bridge 36′ will furnish a mean average reading proportional to, $$i_{avg} = \sum_1^n \frac{1}{\pi}\int_0^\pi A_n \cos(n\omega t + B_n)dt \quad (22)$$

When the angular distance Φ exceeds the angle φ made by the edges ad and bc of the opening 47 the mean average of the A.C. component closely approximates, $$i_{avg} = \left(1 - \frac{\varphi}{2\Phi}\right) \times \frac{I_{max} - I_{min}}{2} \quad (23)$$

This equation can also be written, $$i_{avg} = \left(1 - \frac{\varphi}{2\Phi}\right)\frac{S}{2}A_0^2 \sin 2\alpha \sin 2\theta \quad (24)$$

in which S stands for the surface area of the opening 47. Comparing this expression to the one obtained for harmonic oscillation of the polarizers supporting the frame, $$i_{avg} = \frac{1}{\pi}A_0^2 \sin 2\alpha \sin \theta$$

we may establish the ratio, $$\rho = \left(1 - \frac{\varphi}{2\Phi}\right)\frac{\pi}{2} \quad (25)$$

reaching unity for $\varphi/\Phi = 0.726$.

In other words, the sensitivity increases when the angular ratio $\varphi/\Phi$ decreases. Indeed, the function representative of the output current approaches a square wave function when $\varphi/\Phi$ vanishes.

Besides the sensible gain in sensitivity, the arrangement possesses another advantage. The peak currents $I_{max}$ and $I_{min}$ can be measured by the now classical method of charging a tank capacitance and discharging it by pulses of known electrical charges. The number of pulses necessary to cancel the stored energy measures the peak currents. The arrangement lends itself to direct linkage with digital computers for the control and monitoring of flow control processes.

However, the simple harmonic function can be produced by adequate shaping of the window contour 47. To achieve this result, the equality $$\varphi = \Phi$$

must be established by construction.

Next, the window opening must be given a specific contour such that the free area defined by the contour and the parting line MN between two consecutive quartz plates will follow the relation:

$$S = \frac{S_0}{2}(1 - \cos xm) \qquad (26)$$

where $x$ represents the displacement of the parting line MN in a direction perpendicular to its direction, and $S_0$ is the total area of the opening in the screen.

Assuming that the parting line MN progresses in its displacement while remaining parallel to itself, a condition realized when the mean radius of the quartz disc is close to infinity, it is easy to establish a mathematical expression for the contour.

Equating the surface integral taken with respect to the linear displacement $x$ one obtains, $$S = \frac{S_0}{2}(1 - \cos mx) = \int_{x_1}^{x_2} y\,dx \qquad (27)$$

yielding the ordinate of $y$, $$\frac{ds}{dx} = y = \frac{S_0}{2} m \sin mx \qquad (28)$$

The constant $m$ becomes directly related to the distance $X_2 - X_1$ between the consecutive parting lines MN which defines the periodicity of the surface variation by:

$$m = \frac{\pi}{X_2 - X_1}$$

when such distance is also equal to the length of the window along an axis parallel to the displacement $x$.

Thus, when the opening is given an axis of symmetry parallel to the direction of the displacement, the ordinates of the profile become, $$y = \pm \frac{\pi S_0}{4(X_2 - X_1)} \sin \frac{\pi X}{X_2 - X_1} \qquad (29)$$

In the case of rotation leading to a circular path of the center of gravity of the segment MN, the computation of the profile must be made in terms of polar coordinates.

From the above description, it is now apparent that my novel methods and apparatus for measuring, determining, or otherwise utilizing the angular rotation of a light beam by a substance are based upon a continuous shifting of the plane of polarization of a light beam to one and the other side of a reference plane. Such modulated light beam is passed through a substance under test and through an analyzer and then converted into corresponding electrical variations by a suitable light transducer. By reason of the modulated character of the light beam traversing the substance, the electrical output of the transducers includes both A.C. and D.C. components. By balancing out the D.C. components, the magnitude of the A.C. component corresponds to the angular extent to which the particular substance under test rotates the light beam.

In one embodiment of the invention the light beam is passed through the substance under test and then through an analyzer. A pair of polarizers, whose respective planes of polarization form equal but opposite angles with respect to the plane of polarization of the analyzer, are continuously and alternately interposed, at a constant frequency, into the light beam ahead of the solution under test. A light transducer energized by the light beam emerging from the analyzer converts the light energy into corresponding electrical variations which, because of the continuous shifting of the light beam by the oscillating polarizers, provides an output current having A.C. and D.C. components. By balancing out the D.C. current component, by means of a second light transducer actuated by unpolarized light rays from the single light source, the magnitude of the remaining A.C. output current component varies with the optical rotary power of the solution under test. Consequently, such A.C. current component may be measured by a suitable instrument having a suitably calibrated scale whereby the optical rotary power, angle $\theta$, is obtained directly from a reading of the instrument. Obviously, such direct measuring instrument may be replaced by a recorder and/or control means when the system is applied to monitoring a continuous stream in chemical processing.

In another embodiment of the invention, a single polarizer is disposed in the light beam ahead of the solution under test, such polarizer having its plane of light polarization coinciding with that of the analyzer. In this case, modulation of the light beam, passing through the solution, is accomplished by a pair of light-rotating members, such as quartz plates.

Both of the disclosed light-modulating embodiments of the invention are adapted for use with the various, disclosed measuring circuits. Specifically, two meters may be utilized as disclosed in FIGURE 4, one meter indicating the sum and the other indicating the difference of the two outputs of the light transducer, which outputs correspond to the energies of the two light beams emerging from the analyzer and which arise by reason of the shifting, or rotating, of the polarized light beam to the left and right of the reference axis. Alternatively, a single meter, such as that shown in FIGURE 5, may be used.

I have also described mechanical arrangements for obtaining the optical rotary power. For example, the polarizer may be rotated, as shown in FIGURES 11 and 12, until the A.C. component of the light transducer output is zero.

Such rotation of the polarizer, as indicated by a suitably calibrated scale, corresponds to the angular rotation of the polarized light beam by the solution under test. Alternatively, the polarizer may remain fixed in position and the analyzer may be rotated to provide the same result.

The modulation of the polarized light beam resulting in an A.C. component in the electrical measuring circuit leads to extremely high system sensitivity eliminating the need to amplify the light transducer output in most practical applications.

In the detailed description of my invention here given, it has been assumed that the solution under test possessed optical rotary power, that is, an inherent power to rotate the plane of polarization of a polarized light beam. Some substances, water for example, lack such inherent optical rotary power but possess magnetic rotary power or electrostatic rotary power. In such cases, the solution is subjected, respectively, to an electromagnetic or electrostatic field, and under the influence of such field, the solution will rotate to a greater or lesser extent the plane of polarization of a light beam passing therethrough. While the electrostatic rotary power of a substance is not of primary significance, the importance of the magnetic rotary power equals at least that of the optical rotary power in the field of chemical analysis and physical chemistry. In fact, the magnetic rotary power of water is a term of reference, or comparison, for all other substances. Those skilled in this art will understand that the principles of polarized light beam modulation herein disclosed, as well as the various electrical and mechanical measuring arrangements are not limited in application to substances having optical rotary power. The phenomenon which results in the rotation of a polarized light beam traversing a solution, be it optical, magnetic, or electrostatic, affects in no way the use of the methods and apparatus herein disclosed.

With respect to optically active substances, each such substance possesses a specific coefficient of rotary power which varies with the wave length of the light. The Drude's equation for the variation of the optical rotary power carries one or several terms, $$\frac{K}{\lambda^2 - \lambda_0^2}$$

where the constant $\lambda_0$ is closely related to the wave length of the head of the band of absorption. This physical property is useful as a further step in polarimetric analysis.

By measuring the optical rotation produced by an optically active substance at different wave lengths one can identify the said chemical and its relative concentration C.

Assuming, for instance, that the optical rotary power of a chemical in solution within a solvent obeys a three terms Drude's equation as:

$$(\theta) = \frac{K_1}{\lambda^2 - \lambda_{01}^2} + \frac{K_2}{\lambda^2 - \lambda_{02}^2} + \frac{K_3}{\lambda^2 - \lambda_{03}^2} \quad (30)$$

the optical rotations $$\theta_a = (\theta)_a \times C_1$$

will be measured at seven different wave lengths. Thus a system of seven equations with the seven unknowns:

$$c$$
$$K_1 K_2 K_3$$
$$\lambda_{01}^2 \lambda_{02}^2 \lambda_{03}^2$$

can be written.

The resolving system takes the form:

$$\theta_1 = C_1 \left( \frac{K_1}{\lambda_1^2 - \lambda_{01}^2} + \frac{K_2}{\lambda_1^2 - \lambda_{02}^2} + \frac{K_3}{\lambda_1^2 - \lambda_{03}^2} \right) \text{ for } \lambda_1$$

$$\theta_7 = C_1 \frac{K_1}{\lambda_7^2 - \lambda_{01}^2} + \frac{K_2}{\lambda_7^2 - \lambda_{02}^2} + \frac{K_3}{\lambda_7^2 - \lambda_{03}^2} \text{ for } \lambda_7 \quad (31)$$

which may be solved for the different unknowns.

However, with the already prepared tables of physical constants a rapid identification may be obtained with less difficulty.

For instance, taking four measurements of the optical rotation at four different wave lengths and when only one active chemical is involved either in pure form or in solution we obtain:

$$\theta_1 = (\theta)_1 C_1$$
$$\theta_2 = (\theta)_2 C_1$$
$$\theta_3 = (\theta)_3 C_1$$
$$\theta_4 = (\theta)_4 C_1$$

From these equations we form the identifying ratios:

$$\frac{\theta_4 - \theta_2}{\theta_3 - \theta_1} = \frac{(\theta)_4 - (\theta)_2}{(\theta)_3 - (\theta)_1}; \quad \frac{\theta_4 - \theta_1}{\theta_4 - \theta_1} = \frac{(\theta)_4 - (\theta)_1}{(\theta)_4 - (\theta)_1}$$

$$\frac{\theta_4 - \theta_3}{\theta_2 - \theta_1} = \frac{(\theta)_4 - (\theta)_3}{(\theta)_2 - (\theta)_1}; \text{ etc}$$

which do not depend upon the relative concentration. In this method the precision of the identification depends upon the number of wave lengths selected for measurements.

When, on the contrary, several identified chemical substances are present in the same solvent and their coefficient of rotary power known at different wave lengths, one may compute directly their relative concentrations by solving the system:

$$\theta_1 = (\theta_1)_1 C_1 + (\theta_2)_1 C_2 + (\theta_3)_1 C_3 \ldots (\theta_n)_1 C_n$$
$$\theta_2 = (\theta_1)_2 C_1 \ldots (\theta_n)_2 C_n \ldots$$
$$\theta_n = (\theta_1)_n C_1 \ldots (\theta_n)_n C_n$$

The solutions expressed in terms of their determinants are of the classical form:

$$C_1 = \frac{\Delta_1 \theta(\theta)}{\Delta(\theta)} \ldots C_n = \frac{\Delta_n \theta(\theta)}{\Delta(\theta)}$$

It suffices to indicate that the light beam used to perform the measurement of optical rotation may be furnished by a spectrograph, prism or grating type, instead of a monochromatic light source. With the spectrograph it is easy to scan the complete spectrum in a continuous process to determine if the optical rotation is simple, complex or anomalous.

When measuring or using the rotary power dispersion it is well to remember that the system shifting of the angle of polarization by means of dextrogyre and levogyre quartz plates, as shown in FIGURE 15 for instance, introduces a variable parameter.

The rotation to the right or to the left of the plane of a polarized beam of light passing through quartz plates depends not only upon the thickness of those plates but also upon the wave length of the light.

The phase shift corresponding to the passage of the light through the quartz plates becomes a function of the indices of refraction corresponding to the slow and the fast ray. These indices of refraction vary with the wave length.

Using the Drud's equation expressing the rotary power in terms of the wave length, the angular rotation per millimeter of light path through the quartz is given by:

$$\alpha = \pm \left( \frac{K_1}{\lambda^2 - \lambda_1^2} + \frac{K_2}{\lambda^2 - \lambda_2^2} \right) = \pm \rho(\lambda) \quad (32)$$

Some of the values of the effective angular rotation per mm. are given in the chart below.

*Quartz—Specific rotation vs. wave length in degree/mm.*

| $\lambda = A°$ | $°\alpha$ | $\lambda = A°$ | $°\alpha$ | $\lambda = A°$ | $°\alpha$ |
|---|---|---|---|---|---|
| 7604 | 12°.668 | 5889 | 21°.727 | 4101 | 47°.481 |
| 7184 | 14°.304 | 4861 | 32°.773 | 3609 | 63°.628 |
| 6562 | 17°.318 | 4307 | 42°.604 | 2143 | 235°.972 |

Figure 17:
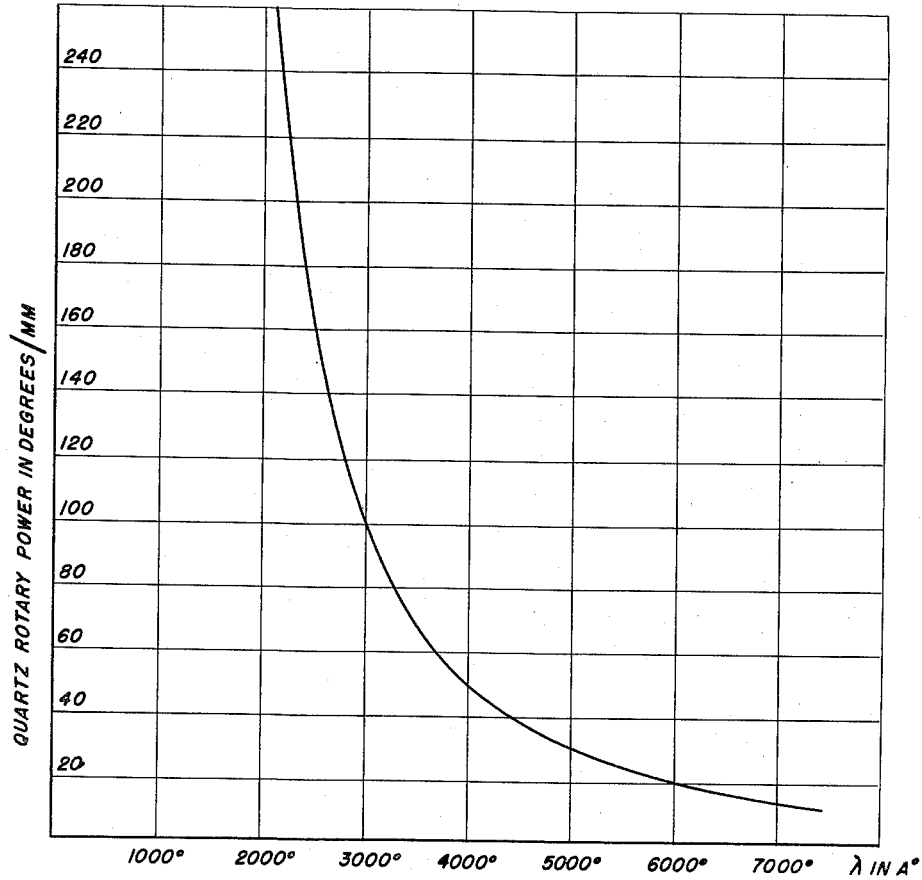
FIGURE 17 is a graph showing the variation in the rotary power of quartz with the wave length of light.

FIGURE 17 shows the graph of the quartz rotary power vs. wave length.

Thus, the difference to the sum ratio $r$ which measures the angle $\theta$ of the optical rotation through the active substance becomes of the form:

$$r = 2 \tan f(\lambda) \times \theta - \ldots \quad (33)$$

with $\theta$ also depending upon the wave length.

No conclusion can be drawn before mathematical analysis of the effect of the variation of the polarization phase angle with the wave length.

For commodity of the writing we shall use the following notation:

$\tan \alpha_1 = a_1$ for the wave length $\lambda_1$
$\tan \alpha_2 = a_2$ for the wave length $\lambda_2$ and the corresponding optical rotations $\theta$ as well as the difference to sum ratios $r$ will be affected by corresponding subscripts 1 and 2.

Therefore, the equations relating the optical rotations to the ratios $r$ can be written:

$$r_2 = 2a_2 \times \theta_2$$
$$r_1 = 2a_1 \times \theta_1$$

from which we deduce the relationship $$\frac{\theta_2}{\theta_1}=\frac{r_2}{r_1}\times\frac{a_1}{a_2}$$

The ratio of the angles of optical rotation is proportional to the ratio of the difference to sum ratios times the reciprocal of the ratio of the tangents of the polarization phase angle.

This simple equation, as developed, permits an immediate identification of the chemical substance. The identification is independent of the relative concentration since it involves a dimentionless factor specific of the chemical. Furthermore, the ratio of the tangents of the polarization phase angles $a_1/a_2$ being known in function of the wave lengths $\lambda_2$ and $\lambda_1$ and being a physical constant of the quartz, it can be used as a term of comparison or a unit of measurement in the determination of the dispersion function $\theta_2/\theta_1$ of the active chemical.

For the other systems using phase angle shifting devices insensitive to the light wave length, like Nicol prism, polaroid material, we also obtain an identification ratio of the same form.

$$\frac{\theta_2}{\theta_1}=\frac{r_2}{r_1}\times\frac{a}{a}=\frac{r_2}{r_1}$$

since tan α remains constant.

This method of qualitative analysis can be applied even when the rotary dispersion is complex or even abnormal; the only difference in the modus operandi consists in the use of more than two wave lengths. For instance, specifying the wave lengths $\lambda_1'\ \lambda_2'\ \ldots\ \lambda_n$ one sets up the identifying factors.

| Quartz Plates | Nicols prism, etc. |
|---|---|
| $\frac{\theta_2}{\theta_1}=\frac{r_2}{r_1}\times\frac{a_1}{a_2}$ | $\frac{\theta_2}{\theta_1}=\frac{r_2}{r_1}$ |
| $\frac{\theta_3}{\theta_1}=\frac{r_3}{r_1}\times\frac{a_1}{a_3}$ | $\frac{\theta_3}{\theta_1}=\frac{r_3}{r_1}$ |
| $\frac{\theta_n}{\theta_1}=\frac{r_n}{r_1}\times\frac{a_1}{a_n}$ | $\frac{\theta_n}{\theta_1}=\frac{r_n}{r_1}$ |

These factors, readily available, avoid the often extremely tedious computation of the Drud's coefficients.

It is important to note that the identifying factor $\theta_n/\theta_0$ when obtained with the same container eliminates the lack of accuracy consecutive to an error in the exact measurement of the light path length. The accuracy depends solely in the precision of the measurement of the difference to the sum ratio.

In many respects, the dispersion of the rotary power takes great similarity with the dispersion coefficient $\nu$ of extensive use in optics. This factor, equal to the variation of the refractive index $dn$ divided by the difference of the index at the wave length of reference minus the vacuum index, characterizes the optical property of a glass, and determines, also, to a great extent, its selection in an optical construction.

Similarly, the rotary power dispersion factor may be taken as the ratio of the variation of the angle of rotation between two specified wave lengths by the value of the rotation at any one of the limiting wave lengths.

Thus, with this definition, we obtain the mathematical writing $$\nu=\left(\frac{\Delta\theta}{\theta}\right)_{\lambda_0}^{\lambda}$$

whose meaning is explicited in terms of a percentage variation easier to use in computation since comparison and measurements by difference lead to higher accuracy.

In terms of the measurable ratios $r$ and of the tangent α of the polarizer phase angle, the value takes the general form:

$$\nu=\frac{\theta_2-\theta_1}{\theta_1}=\frac{r_2}{r_1}\times\frac{a_1}{a_2}-1 \quad (34)$$

where $\theta_1$ is the rotation as measured at the wave length $\lambda_1$.

At first glance, it is logical to discuss the sensitivity of the method as depending upon the ratio $a_1/a_2$ of the phase angle tangents. The smaller this ratio can be made, for a constant $r_2/r_1$ ratio, the higher the sensitivity in $d\nu$. Taking the differential of the relative dispersion with respect to the measurable variables $r_2$ and $r_1$ and making the ratio of the tangents $a_2/a_1=K$ we get:

$$d\nu=\frac{1}{K}\times\frac{r_1 dr_2-r_2 dr_1}{r_1^2} \quad (35)$$

But the differential increments $dr_2$ and $dr_1$ are equal since they cannot be different from the precision of the measuring instrument.

Hence, $$d\nu=\frac{1}{K}\frac{(r_1-r_2)}{r_1^2}dr=\frac{1}{K}\times\frac{2a_1\theta_1-2a_2(\theta_1+\Delta\theta)}{4a_1^2\theta_1^2}\times dr \quad (36)$$

yielding:

$$d\nu=\frac{1}{K}\times\frac{1}{2a_1\theta_1}\left(1-K-K\frac{\Delta\theta}{\theta_1}\right)dr \quad (37)$$

The quantity between brackets may become zero and when it does the sensitivity reaches infinity since for a given measurable variation $dr$ the corresponding increment $d\nu$ approaches zero. This particular condition arises for the case where $$\frac{\Delta\theta}{\theta_1}=-\frac{K-1}{K}=\nu\ \text{and}\ K=\frac{1}{\left(1+\frac{\Delta\theta}{\theta}\right)} \quad (38)$$

Therefore, the very important conclusion for experimental purpose: the precision in the determination of the percentage dispersion factor increases toward infinity when the amplitude of the variation $\Delta\theta$ is opposite in sign with the optical rotation $\theta_1$ used as reference. The ratio of the variation $\Delta\theta$ by the value $\theta_1$ approaches $-1$ when the factor K reaches infinity.

This finding has considerable importance in the determination of the Cotton's effect. Through this behavior of the quartz plates in shifting the angle of polarization, a great accuracy is achieved in the determination of the point of reversal of the optical rotation and of the tangent to this point.

For better understanding, one may compare the sensitivity $d\nu$ obtained against the sensitivity $d\nu_0$ when the phase angle of the polarizer does not vary with the wave length.

The sensitivity $d\nu_0$ at constant tan α=$a$ has for its expression, $$d\nu_0=\frac{r_{01}-r_{02}}{r_{01}^2}dr=\frac{-1}{2a\theta}\times\frac{\Delta\theta}{\theta}\times dr \quad (39)$$

For $$\frac{\Delta\theta}{\theta}$$

and the value $dr$ of the instrument sensitivity remaining constant, the sensitivity in $d\nu_0$ increases when the factor $a$, equal to the tangent of the phase angle, increases.

Thus, establishing the ratio $$\frac{d\nu}{d\nu_0}=\frac{a}{Ka_1}\times\frac{\left(1-K-K\frac{\Delta\theta}{\theta}\right)}{-\frac{\Delta\theta}{\theta}} \quad (40)$$

and noting that $K=a_2/a_1$, we see that the ratio of the two sensitivities becomes proportional to the ratio of the tangents of the phase angle $a/a_2$. Admitting that the value $a$ is chosen equal to $a_2$ the ratio of the sensitivities still remains equal to $$\frac{d\nu}{d\nu_0} = \frac{1 - K - K\frac{\Delta\theta}{\theta}}{-\frac{\Delta\theta}{\theta}} \quad (41)$$

and for $$\frac{\Delta\theta}{\theta} = -1 + \frac{1}{K} \text{ or } K = \frac{1}{\left(1 + \frac{\Delta\theta}{\theta}\right)} \quad (42)$$

reaches 0.

The coefficient K is greater than one for any negative value of the ratio $\Delta\theta/\theta$. In other words, when the optical rotation $\theta$ decreases with the wave length, the factor K can be so selected as to lead to extreme sensitivity.

The ratio of the sensitivities can approach zero for $\Delta\theta$ positive, that is, when the optical rotation increases while the wave length decreases for values of K smaller than one. In this specific case, the tangent of the phase angle of the polarization must decrease when the wave length decreases. Unfortunately, this condition cannot be fulfilled since the angle of rotation of the polarization axis produced by the quartz plate increases when the wave length decreases.

This last condition can still be met. In fact, when the phase angle of the polarization plane is included between $$\frac{\pi}{2} \text{ and } \pi$$

an increase $d\alpha$ corresponds to a decrease of its tangent in absolute value.

Therefore, the condition for increased sensitivity in the measurement of the dispersion of the rotary power can always be met.

The variation of the phase angle of the polarization axis caused by the quartz plates dispersion factor is not detrimental for precision measurement. On the contrary, it represents a considerable advantage when properly used to increase the resolving power in the measurement of rotary power dispersion factor.

Figure 18:
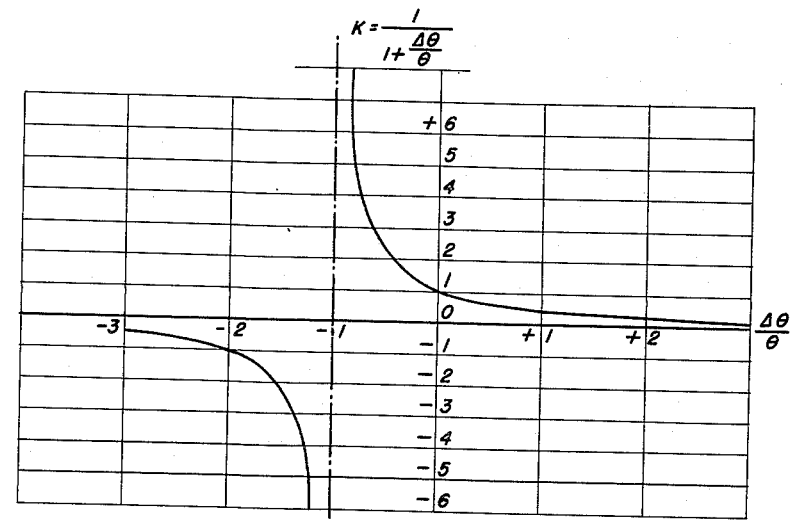
FIGURE 18 is a graph showing the variation of certain factors relating to the dispersion of the optical rotary power.

The curve, FIGURE 18, indicates the variation of the ratio $K = a_2/a_1$ which makes the sensitivity, in the measurement of the dispersion, equal to infinity.

The computation of the necessary thickness $e$ of the quartz plates which will produce the requested tangents $a_2$ and $a_1$ for the wave lengths $\lambda_2$ and $\lambda_1$ offers no difficulty. Knowing the quartz rotary power $\alpha_{01}$ and $\alpha_{02}$ per millimeter for the specified wave lengths and the angles $\alpha_1$ and $\alpha_2$ corresponding to the tangets $a_2$ and $a_1$ we can write the equations:

$$M_1 \times 180° + \alpha_1 = e\alpha_{01}$$
$$M_2 \times 180° + \alpha_2 = e\alpha_{02}$$

where $M_1$ and $M_2$ are entire positive integers.

The solution yields the requested thickness:

$$e = \frac{\alpha_2 - \alpha_1 + (M_2 - M_1)180°}{\alpha_{02} - \alpha_{01}} \quad (43)$$

in which $M_2 - M_1 = 0, 1, 2, 3 \ldots$ or an entire integer.

Greater flexibility can be managed when one admits for the angle $\alpha_2$ the angle $\pi - \alpha_2$ corresponding to the symmetrical positions of the vector $P_2$ with respect to the axis of the light beam. But in that case the sign of the difference to the sum ratio $r$ changes and this change of sign must be noted in the measurements of the optical rotation. The vector diagram represented in FIGURE 19 furnishes an objective explanation of such behavior.

Figure 19:
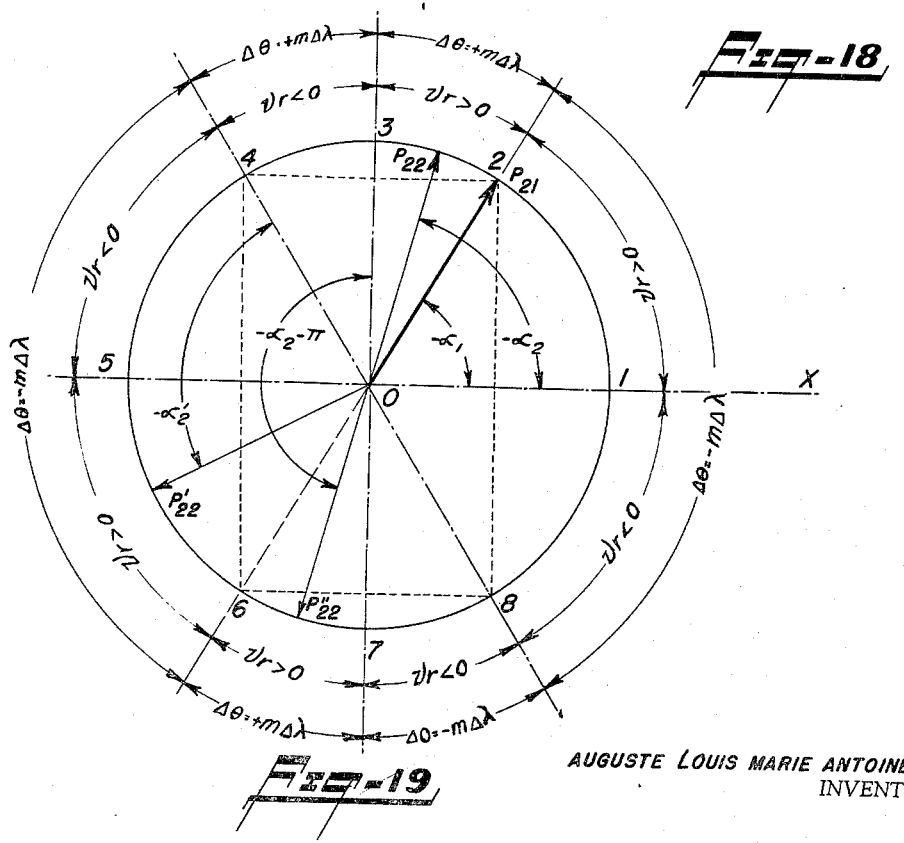
FIGURE 19 is a vector diagram supplementing the mathematical presentation, relating to the dispersion of the optical rotary power.

The vectorial diagram of FIGURE 19 illustrates the various conditions to be observed in the selection of the angles $\alpha_1$ and $\alpha_2$ made by the polarization plane of the polarizer with respect to the reference axis OX and depending upon the sign of the dispersion factor $$r\frac{\Delta\theta}{\theta}$$

In order to secure the maximum sensitivity in the measurement of the rotary dispersion factor the following condition must be fulfilled or at least approximated, $$K = \frac{1}{1 + \frac{\Delta\theta}{\theta}} \text{ with } K = \frac{a_2}{a_1}$$

This condition may be written, $$a_2 = \frac{a_1}{1 + \frac{\Delta\theta}{\theta}}$$

indicating that when $$\frac{\Delta\theta}{\theta}$$

is positive the tan $a_2$ of the angle $\alpha_2$, made between the polarization plane of the polarizer and the reference axis OX, must be smaller than $a_1$. Thus, for the vector $OP_{21}$ (representing the plane of light polarization of the polarizer for the wave length $\lambda_1$) making the angle $-\alpha_1$, whose tangent is $a_1$, one must locate the vector within either the sector 1,2 or 5,6, such as $P_{22}'$. Since the rotary power of quartz increases as the wave length of the light decreases, the required condition wherein tan $a_2$ is smaller than $a_1$ and of the same sign can only be obtained if the rotation $\Delta\alpha$ of the plane of polarization for the variation $\lambda_1 - \lambda_2$ becomes, $$-\pi \leq \Delta\alpha \leq -\pi + \alpha_1 \quad \text{(sector 5,6)}$$
$$-2\pi \leq \Delta\alpha \leq -2\pi + \alpha_1 \quad \text{(sector 1,2)}$$

In that case, the ratio $a_2/a_1$ remains positive and the measured valve $\mu$ is of the same sign as the difference to the sum ratio $r$. Hence, the product $\mu \times r$ is positive.

If, on the other hand, the rotary dispersion $$\frac{\Delta\theta}{\theta}$$

is negative, the value of $a_2$ of the tangent of the angle $-\alpha_2$ must be greater than the value $a_1$ of the tangent of the angle $-\alpha_1$ and of the same sign. Then, the direction of the polarized light for the wave length $\lambda_2$ must be selected either within the sector 2,3 or the sector 6,7, such as the illustrated vectors $OP_{22}$ or $OP_{22}''$.

The rotation $\Delta\alpha$ of the plane of polarization produced by the quartz, when the light wave length decreases from $\lambda_1$ to $\lambda_2$ must be, $$-\frac{\pi}{2} + \alpha_1 \leq \Delta\alpha \leq 0$$

$$-\frac{3\pi}{2} + \alpha_1 \leq \Delta\alpha \leq -\pi$$

Under this condition, the product $\mu \times r$ (rotary dispersion $\mu$ multiplied by the difference to sum ratio $r$) remains positive.

It is apparent that other sectors 3,4; 4,5; 7,8 and 8,1 can be utilized for the vector orientation of the light-polarizing plane of the polarizer but in such cases the tangents $a_2$ become of opposite sign to the tangent $a_1$ of the angle $-\alpha_1$ so that the product $\mu \times r$ becomes negative.

Thus, it will be apparent that the thickness of the dextrogyral and sinistrogyric quartz plates of the rotating disc performing the shifting of the polarization phase angle, FIGURES 14 and 15, preferably, will be such as to permit the use of two, or several, light wave lengths properly selected within the spectrum. If other wave lengths must be used, the system of quartz plates can be replaced by another one of different thickness.

Having now described various embodiments of my invention in detail, those skilled in this art will find no difficulty in making changes and modifications in the disclosed methods and apparatus in order to adapt them to specific applications. It is intended that such changes and mod-

I claim:

1. A method of determining the rotation of the plane of polarization of polarized light by a substance which method comprises passing a polarized light beam along a single axis through the substance and through a light-polarizing member having a known plane of light polarization, said light beam being centered along said axis; abruptly and alternately changing the plane of polarization of the said light beam as it enters the substance in positive and negative directions at a constant frequency and without displacement relative to the said axis; converting the light beam emerging from the said light-polarizing member into corresponding electrical variations which variations include A.C. and D.C. components; and measuring the ratio of the said A.C. to D.C. components to determine the extent to which said substance rotates the plane of polarization of polarized light.

2. The invention as recited in claim 1, wherein the plane of polarization of the said light beam is changed in equal positive and negative directions relative to the polarization plane of the said light-polarizing member.

3. A method of determining the rotation of the plane of polarization of polarized light by a substance which method comprises passing a polarized light beam along a single axis through the substance and through a light-polarizing member having a known plane of light polarization, said light beam being centered along said axis; abruptly and alternately changing the plane of polarization of the said light beam as it enters the substance in positive and negative directions at a constant frequency and without displacement relative to the said axis; converting the light beam emerging from the said light-polarizing member into corresponding electrical variations which include A.C. and D.C. components; and simultaneously measuring the said A.C. and D.C. components to determine the extent to which the substance rotates the plane of polarization of polarized light.

4. A method of determining the rotation of the plane of polarization of polarized light by a substance which method comprises passing a polarized light beam along a single axis through the substance and through a light-polarizing member having a known plane of light polarization, said light beam being centered along said axis; abruptly and alternately changing the plane of polarization of the said light beam as it enters the substance in positive and negative directions at a constant frequency and without displacement relative to the said axis; converting the light beam emerging from the light-polarizing member into corresponding electrical variations which include A.C. and D.C. components, reducing the said D.C. component to zero; and measuring the A.C. component to determine the extent to which the substance rotates the plane of polarization of polarized light.

5. In polarimetric apparatus, the combination of means forming a light beam centered about a given axis and passing through a solution under test; a light-polarizing member having a known plane of light polarization and interposed in the light beam emerging from the solution; means polarizing the said light beam as it enters the solution alternately in positive and negative directions at a constant frequency and without displacement of the said axis; a light transducer energized by the light beam emerging from the said light-polarizing member and producing corresponding electrical variations; and means for simultaneously measuring the individual A.C. and the D.C. components of the said electrical variations.

6. In polarimetric apparatus, the combination of means forming a light beam centered about a given axis and passing through a solution under test; a light-polarizing member having a known plane of light polarization and interposed in the light beam emerging from the solution; means polarizing the light beam as it enters the solution alternately in positive and negative directions at a constant frequency and without displacement of the said axis; a light transducer energized by the light beam emerging from the said light-polarizing member and producing corresponding electrical variations; and means connected to the light transducer for measuring the ratio of the A.C. to D.C. components of the said electrical variations.

7. Polarimetric apparatus comprising a light source; means forming light from said source into a first light beam centered about a given axis and along a given axis and impinging on a first light transducer; means interposable into the first light beam and adapted to contain a solution under test; an analyzer having a predetermined plane of light polarization and interposed in the first light beam between the said first light transducer and the solution under test; means polarizing the first light beam as it enters the solution; means abruptly changing the plane of polarization of the light beam entering the solution at a constant frequency and without displacement of the said axis within a range defined by known but opposite angles with respect to the plane of polarization of the analyzer; a second light transducer; means forming light from said source into a second light beam impinging on the second light transducer; and measuring means simultaneously responsive to the outputs of both of the said light transducers.

8. The invention as recited in claim 7, wherein the means responsive to the outputs of the light transducers comprises a rectifier bridge having input terminals connected to the first light transducer, a current-responsive device connected to the output terminals of the rectifier bridge, and circuit elements connecting the second light transducer to the input terminals of the rectifier bridge in a polarity sense opposite to that of the first light transducer, and including a second current-responsive device connected in series between the first light transducer and the input terminals of the bridge.

9. The invention as recited in claim 8, including means adjusting the relative output of the second light transducer.

10. The invention as recited in claim 7, wherein the means responsive to the outputs of the two light transducers comprises a rectifier bridge; a ratio meter having a movable coil energized by a constant current, a first set of stationary field coils connected in series between the first light transducer and the input terminals of the bridge, and a second set of stationary field coils connected to the output terminals of the bridge; the second light transducer being connected to the input terminals of the bridge in a polarity sense opposite to that of the said first light transducer.

11. Polarimetric apparatus comprising a light source; means forming light from said source into a first light beam centered about a given axis and impinging on a first light transducer; means interposable into the first light beam and adapted to contain a solution under test; an analyzer having a known plane of light polarization and interposed in the first light beam between the said first light transducer and the solution; a pair of polarizers insertable into the first light beam ahead of the solution, said polarizers having their respective planes of light polarization forming known but opposite angles with respect to the plane of polarization of the analyzer; means alternately moving first one and then the other of said polarizers into the first light beam at a constant frequency and without displacement of said axis; a second light transducer; means forming light from said source into a second light beam impinging on the second light transducer; and measuring means simultaneously responsive to the outputs of both light transducers.

12. The invention as recited in claim 11, wherein the pair of polarizers are in edge-abutting contact along a straight parting line, and including a light shield having a light-passing opening formed therein, said shield being so disposed that the said opening normally is bisected by the said parting line, and the amplitude of the movement of the polarizers is such that the said parting line coincides alternately with opposed side edges defining said opening.

13. Polarimetric apparatus comprising a light source; means forming a light beam impinging on a first light transducer; means interposable into the light beam and adapted to contain a solution under test; an analyzer having a known plane of light polarization and disposed in the light beam between the said first light transducer and the solution; a polarizer disposed in the light beam between said light source and the solution, said polarizer having its plane of polarization coinciding with that of the analyzer; a pair of light-rotating members, one capable of rotating light to the left and the other capable of rotating light to the right; means alternating inserting the said light-rotating members into the light beam between said polarizer and the solution; a second light transducer; means directing light from the said source directly onto the second light transducer; and means simultaneously responsive to the outputs of said light transducers.

14. The invention as recited in claim 13, wherein the light-rotating members are mounted on a rotatable member; and means rotating the said rotatable member at a constant velocity.

15. The invention as recited in claim 14 wherein said light-rotating members are arcuate segments with adjacent edges abutting each other; and including a light shield having a light-passing opening formed therein, said opening being disposed in the light beam ahead of said light-rotating members and the opening being defined by a pair of lines extending radially from the axis of rotation of the rotatable member and a pair of spaced arcuate lines concentric with such axis.

16. Polarimetric apparatus comprising a light source; means forming a light beam impinging on a first light transducer; means interposed in the light beam and adapted to contain a solution under test; an analyzer having a known plane of light polarization and disposed in the light beam between the first light transducer and the solution; a pair of polarizers lying in a common plane and having adjacent ends abutting each other along a linear reference line, said polarizers having their respective planes of light polarization oriented at equal but opposite angles with respect to the polarizing plane of the analyzer; means vibrating the polarizers at a constant frequency so that first one and then the other is inserted into the light beam ahead of the solution; a light shield having a light-passing opening formed therein, said shield being positioned ahead of the polarizers and such that the opening is disposed in the light beam and bisected by the said reference line when the polarizers are stationary; means limiting the extent of vibration of the polarizers such that the said reference line moves into correspondence with opposite edges defining the light shield opening; current-responsive means responsive to the A.C. and D.C. output components of the first light transducer; a second light transducer energized by the light source; circuit elements connecting the second light transducer to the current responsive means in opposed sense to the first transducer; and means to adjust the output of the second transducer to balance the D.C. output component of the first transducer.

17. Polarimetric apparatus comprising a light source; means forming a substantially parallel light beam; a first light transducer energized by the light beam; means interposed in the light beam and adapted to contain a solution under test; an analyzer disposed in the light beam between the first light transducer and the solution; a polarizer disposed in the light beam between said light source and the solution, said polarizer having its plane of light polarization coinciding with that of the analyzer; a pair of light-rotating members, one capable of rotating light to the left and the other capable of rotating light to the right; means alternately passing one and the other light-rotating members through the light beam in a plane ahead of the solution; a light shield having an opening formed therein of predetermined configuration, said shield being positioned ahead of the light-rotating members with the center of said opening on the axis of the light beam; a second light transducer; means directing light from the said source onto the second light transducer; current responsive means responsive to the D.C. and A.C. output components of the first light transducer; means bucking the output of the second light transducer against the D.C. output component of the first light transducer; means adjusting the output of the second light transducer to exactly cancel the D.C. output component of the first light transducer; and means rotating the said polarizer to reduce the A.C. output component of the first light transducer to zero; and means indicating the angular rotation of the polarizer.

References Cited in the file of this patent

UNITED STATES PATENTS

| 1,959,549 | Sauer | May 22, 1934 |
| 2,500,547 | Kalmus et al. | Mar. 14, 1950 |
| 2,503,808 | Earl et al. | Apr. 11, 1950 |
| 2,624,236 | Kirkpatrick et al. | Jan. 6, 1953 |
| 2,630,735 | Rouy | Mar. 10, 1953 |
| 2,829,555 | Keston | Apr. 8, 1958 |
| 2,861,493 | Landegren | Nov. 25, 1958 |

FOREIGN PATENTS

| 540,876 | Great Britain | Nov. 4, 1941 |

OTHER REFERENCES

Electronic Fundamentals and Application, Ryder, 6th printing, Prentice Hall, August 1955, page 667.